Aug. 3, 1965
R. P. DOERER ETAL
3,198,217
METHOD AND APPARATUS FOR MANUFACTURING
REINFORCED FABRIC PANELS
Filed June 23, 1960
22 Sheets-Sheet 1
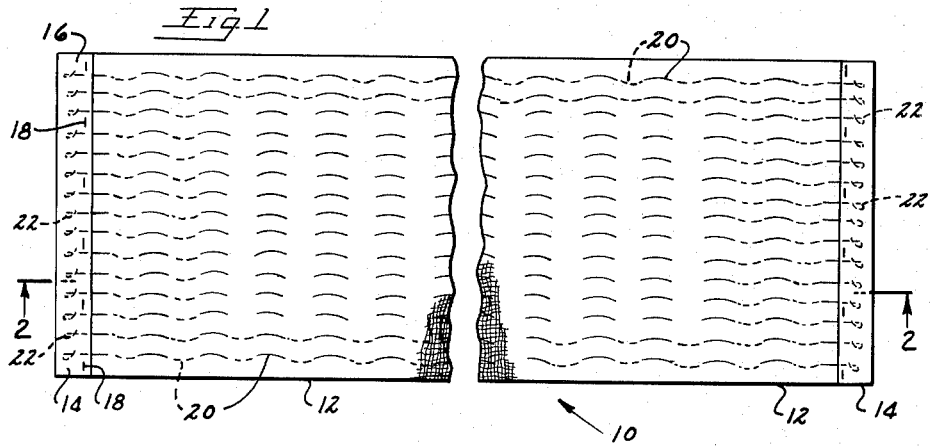
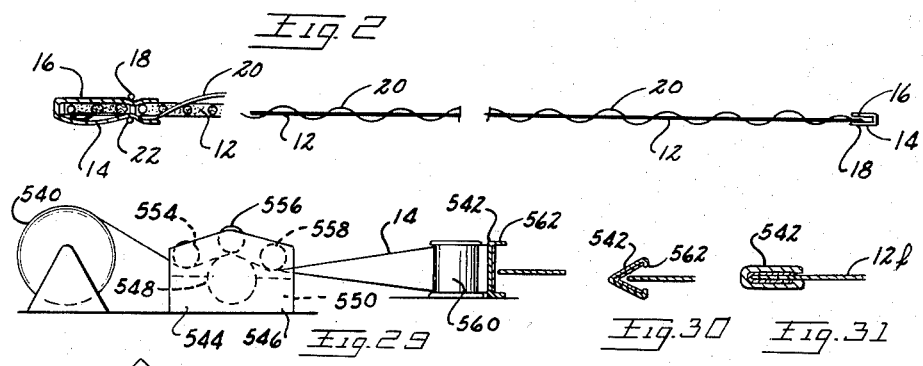
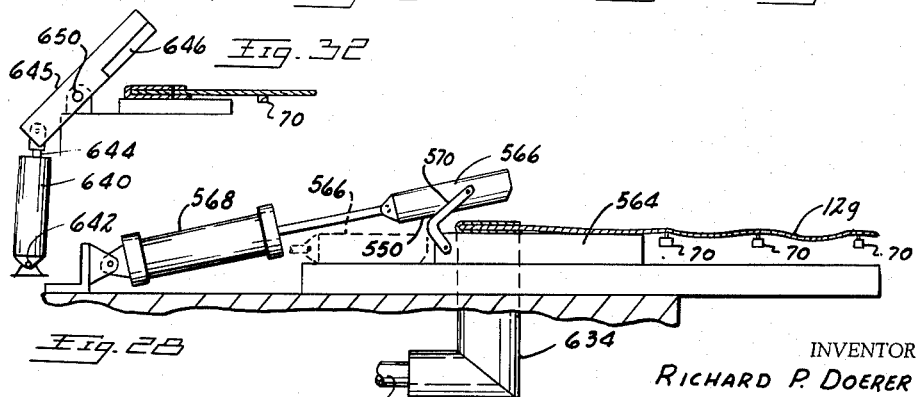
INVENTORS
RICHARD P. DOERER
HERMAN G. GUENTHER
BY *Whittemore, Hulbert & Belknap*
ATTORNEYS

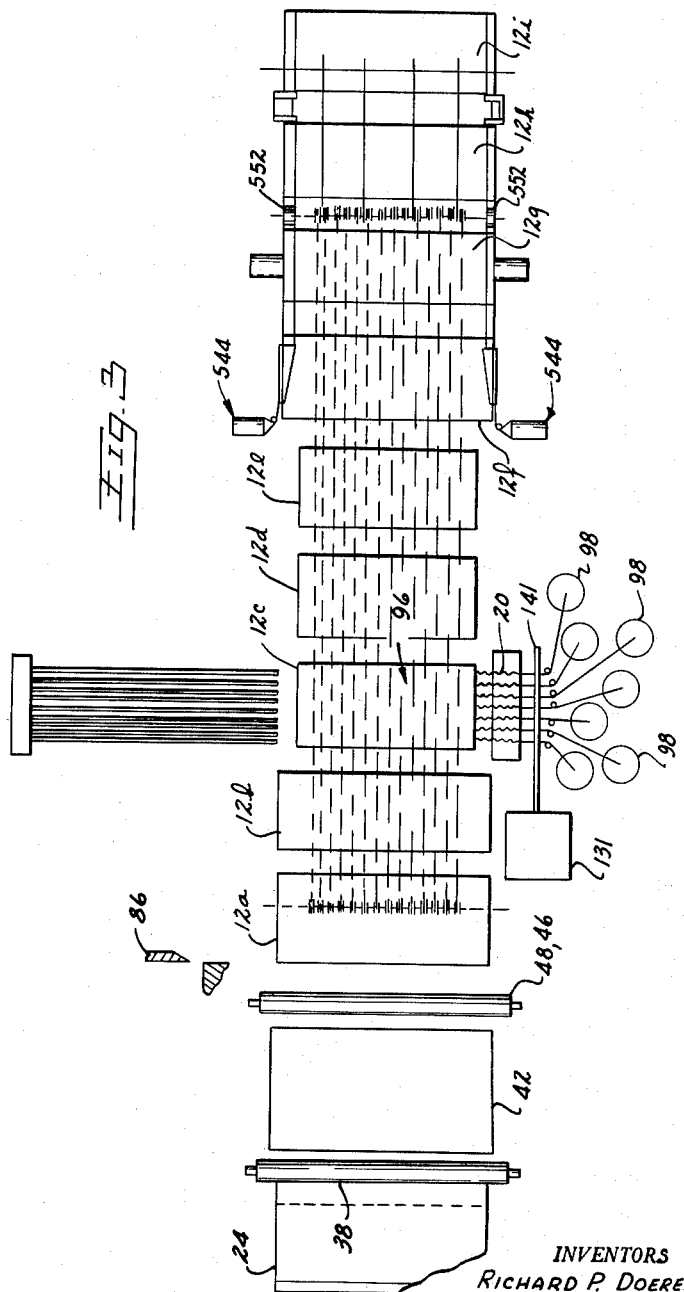

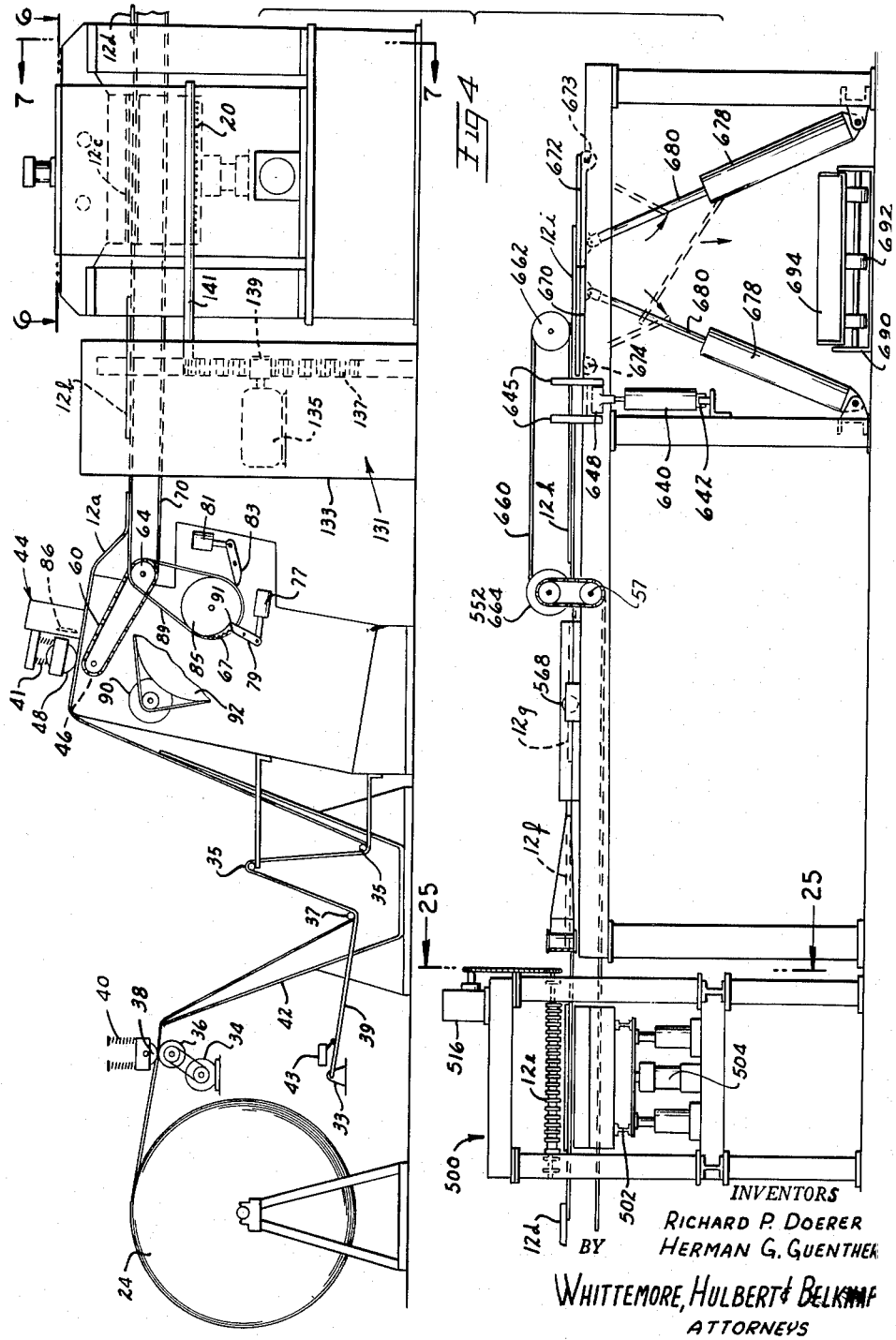

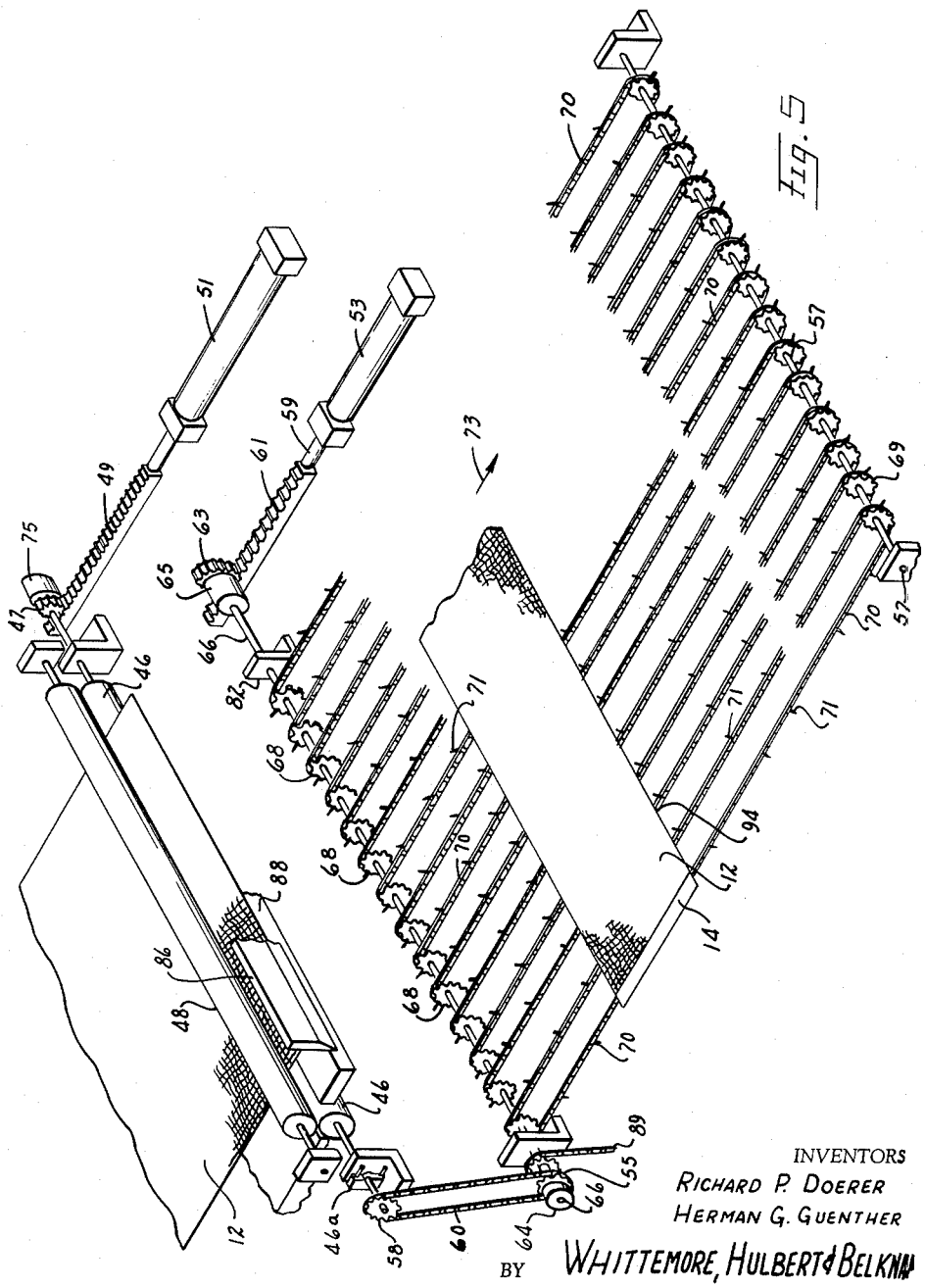

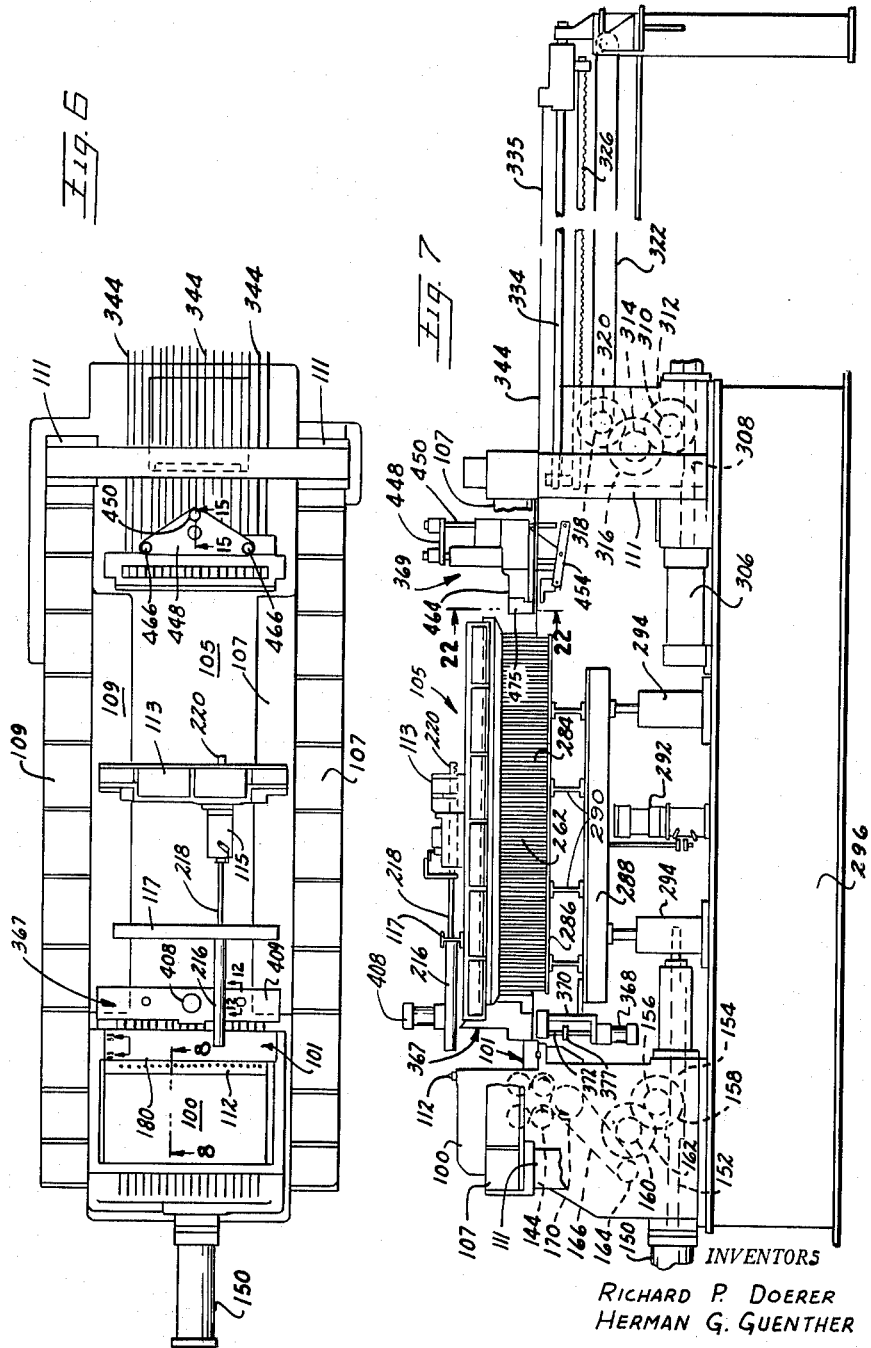

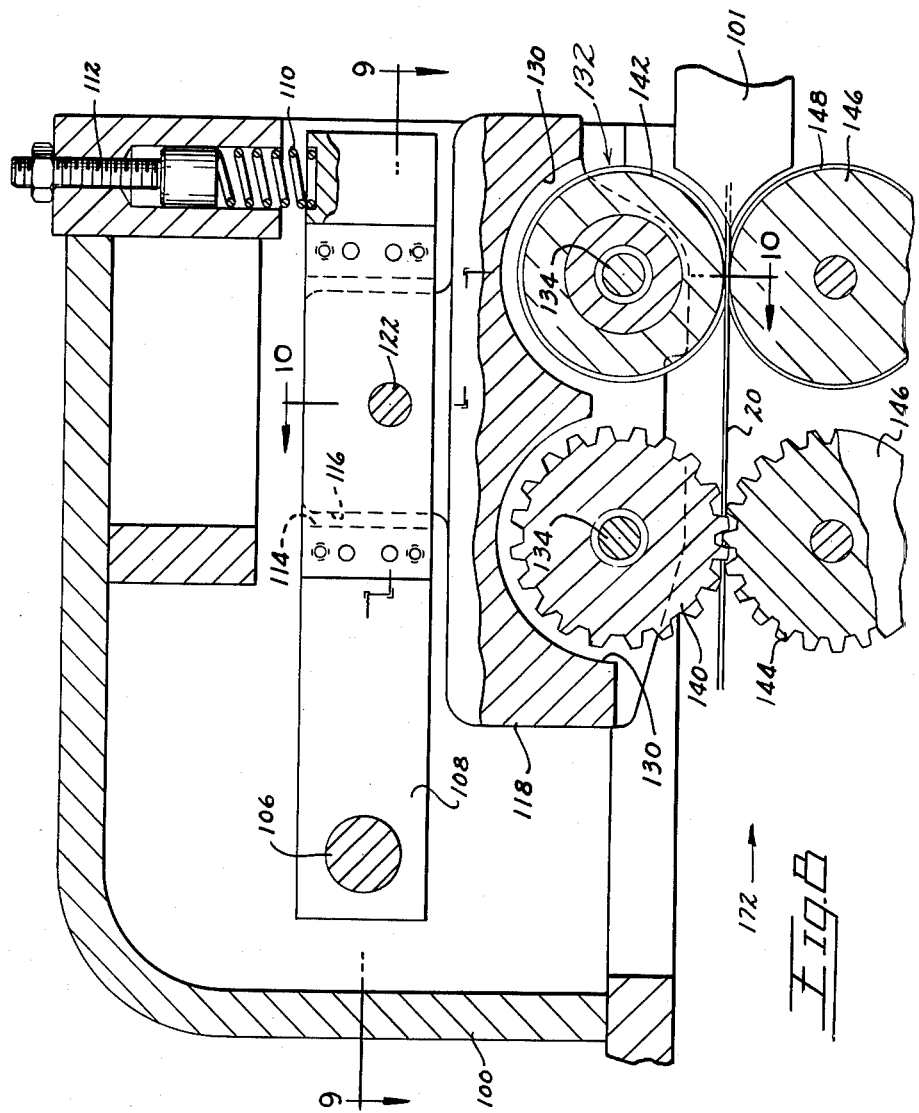

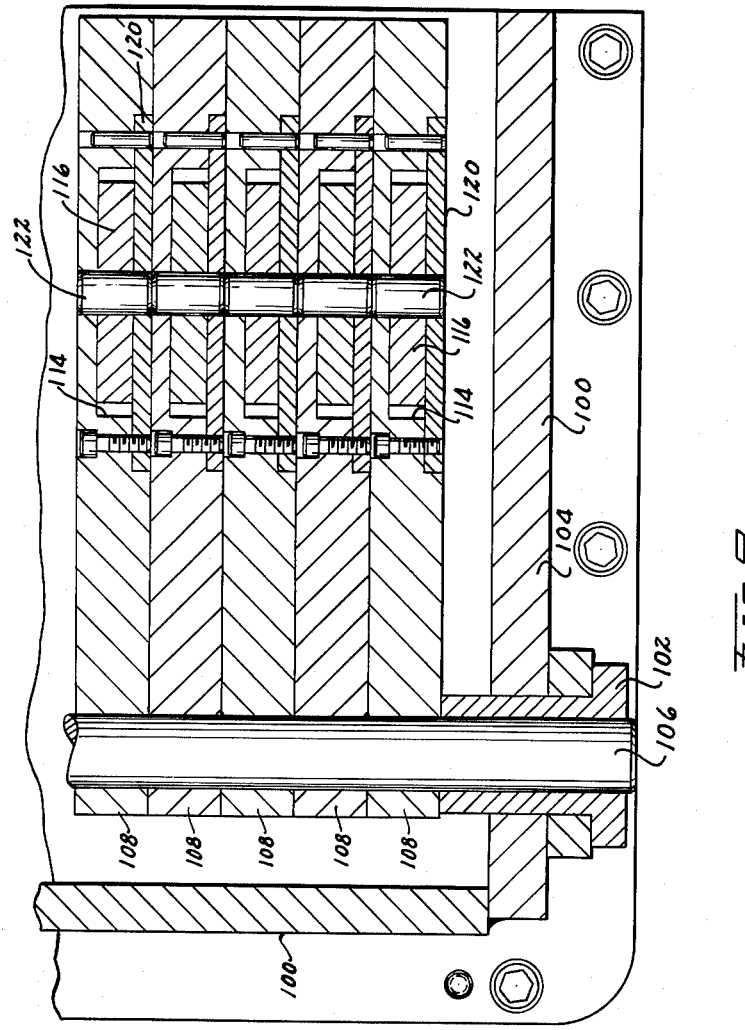

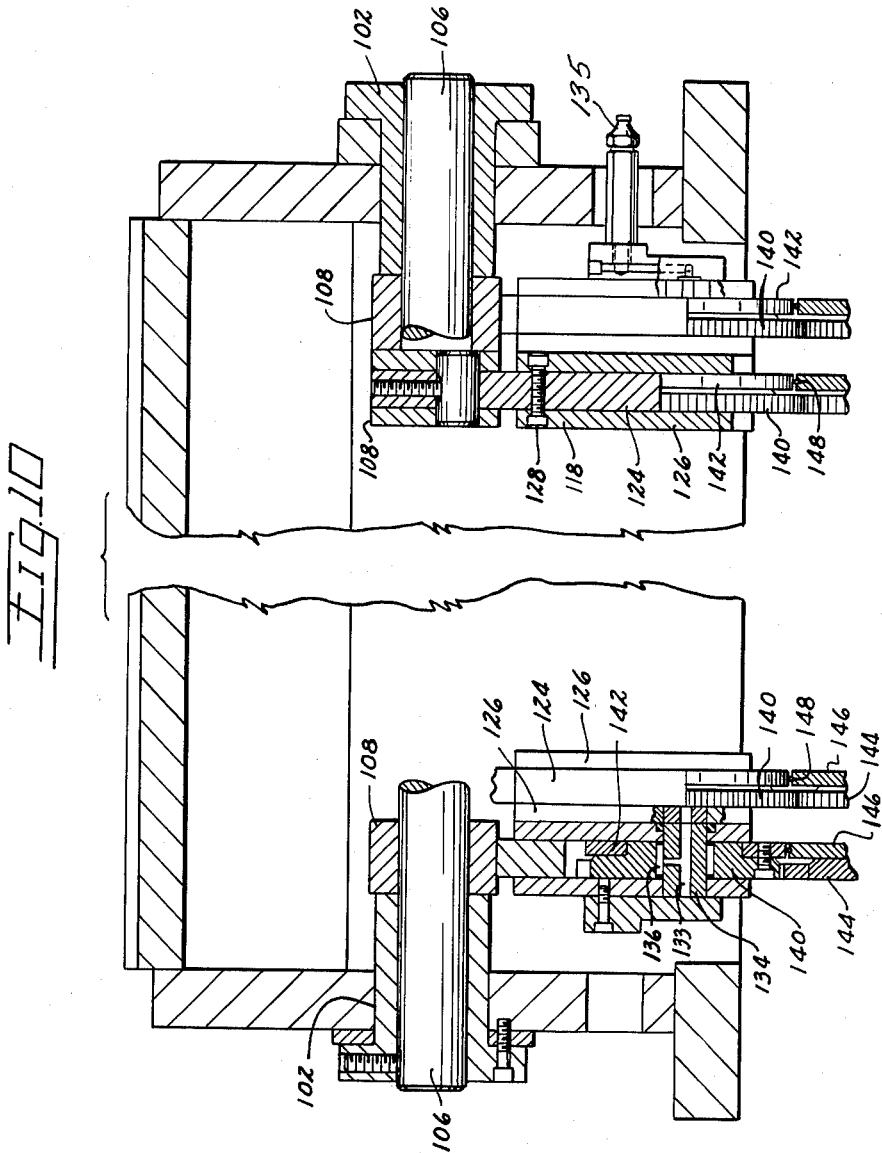

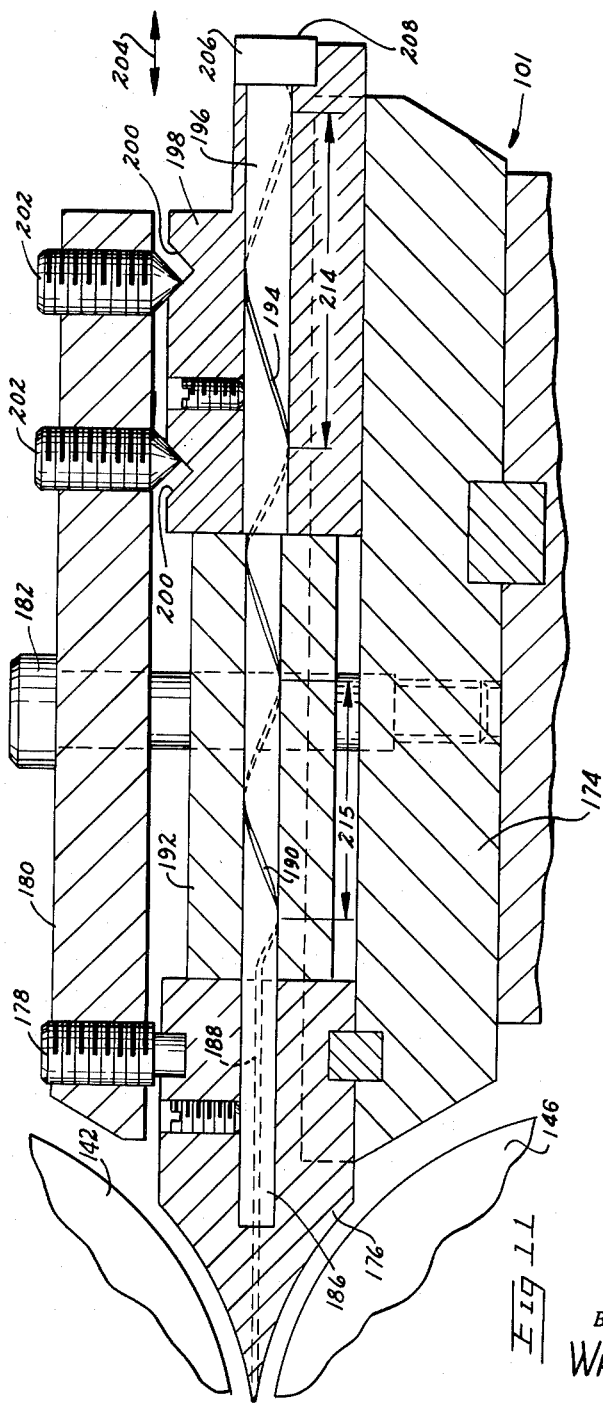

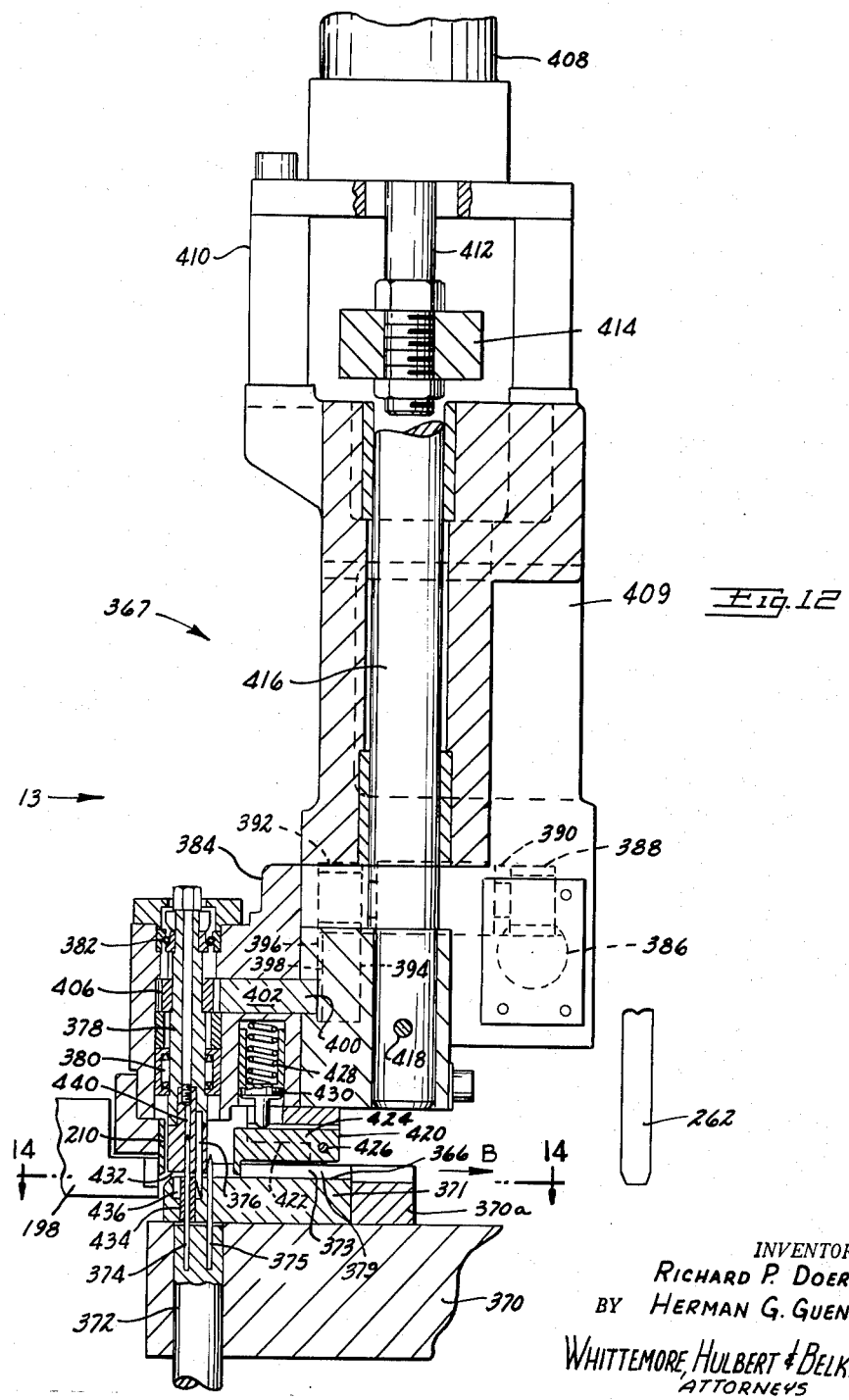

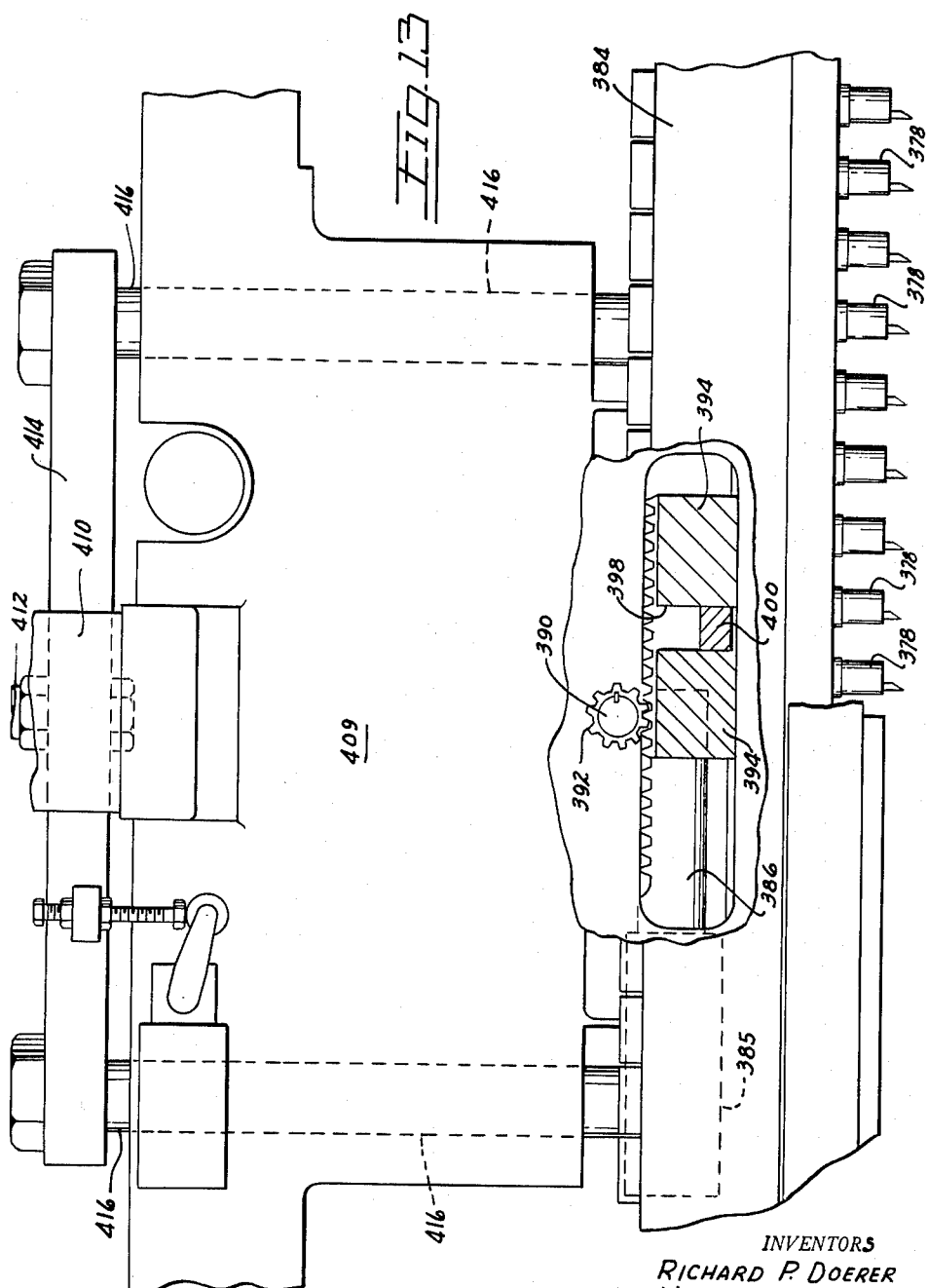

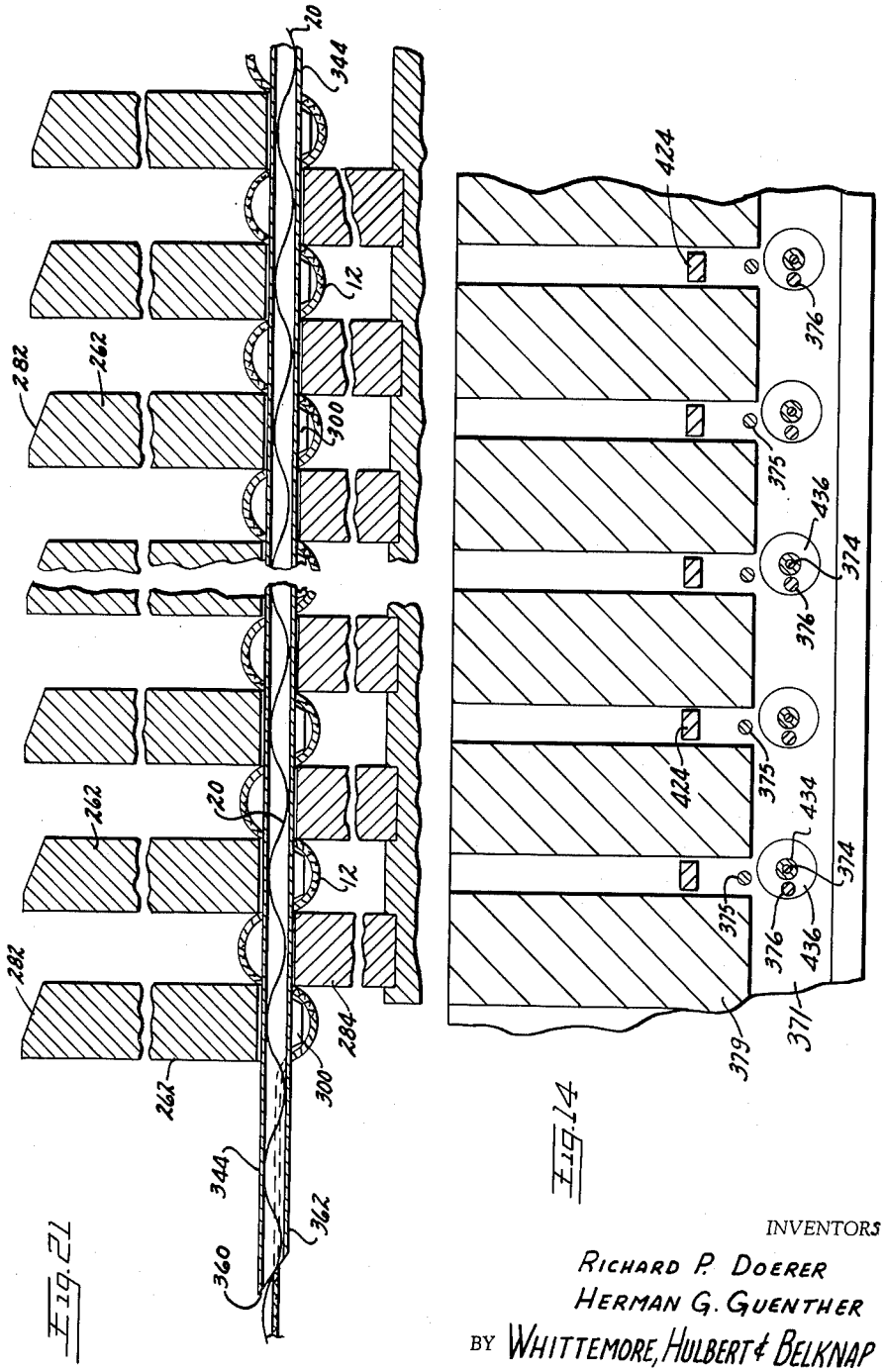

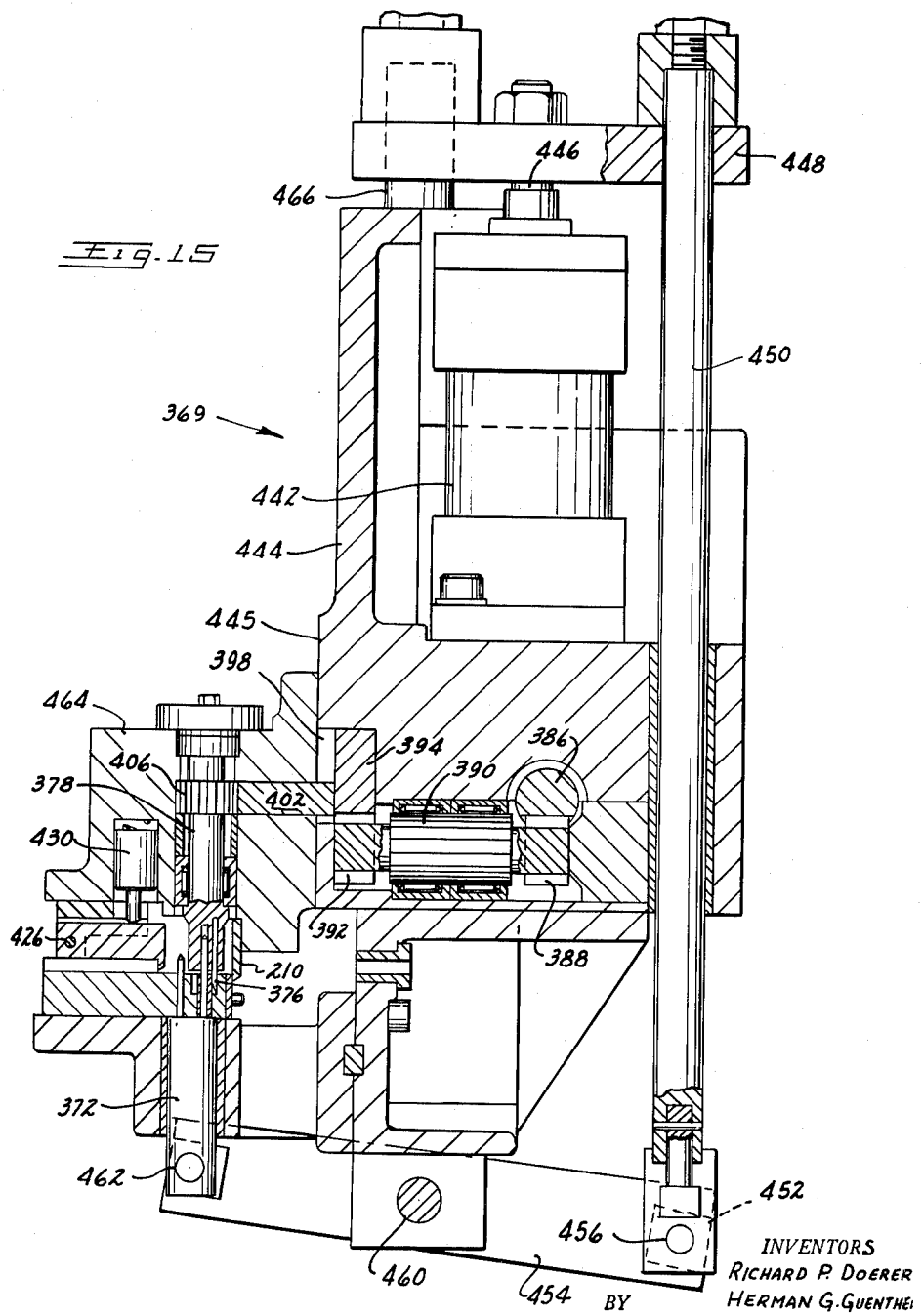

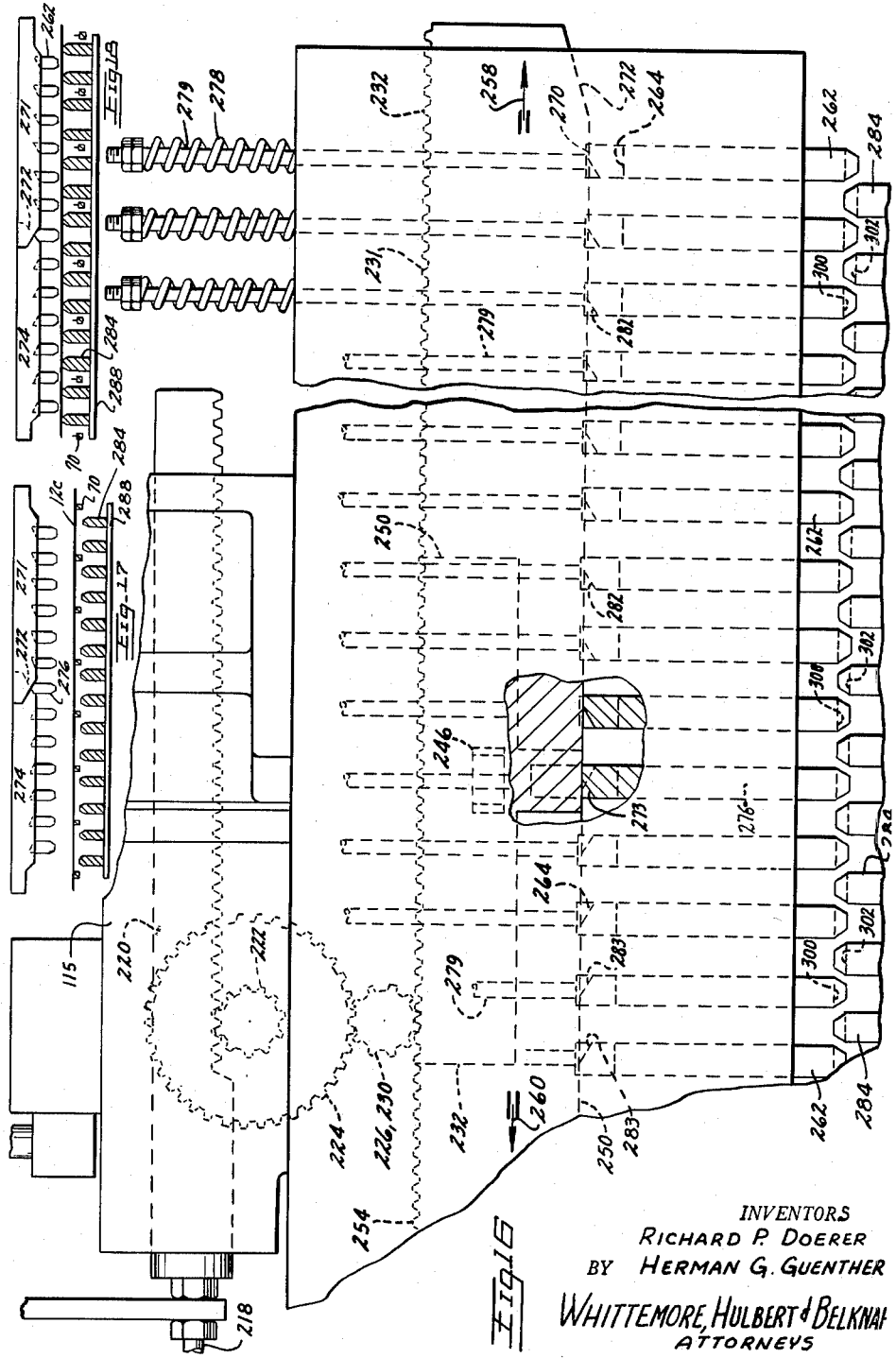

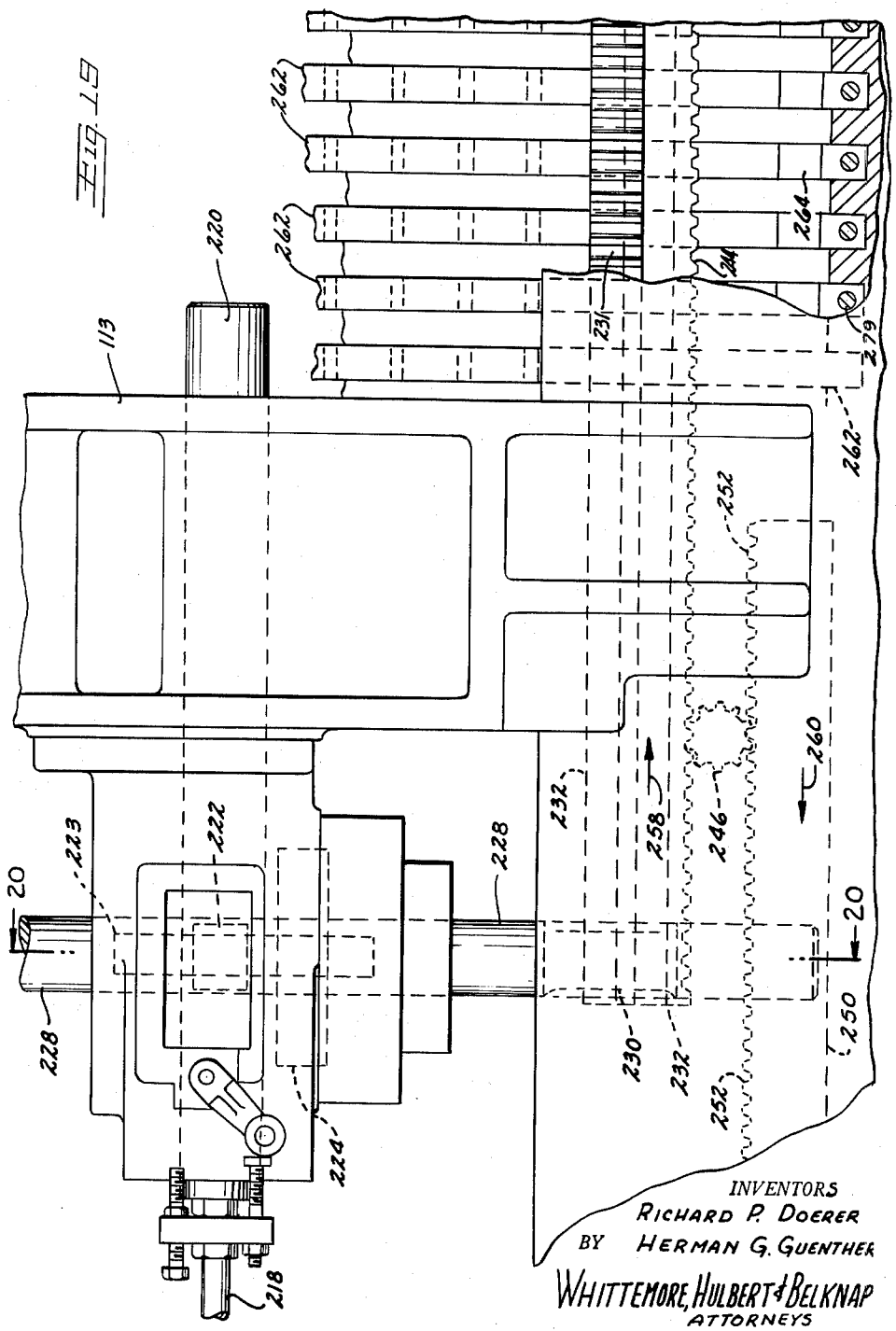

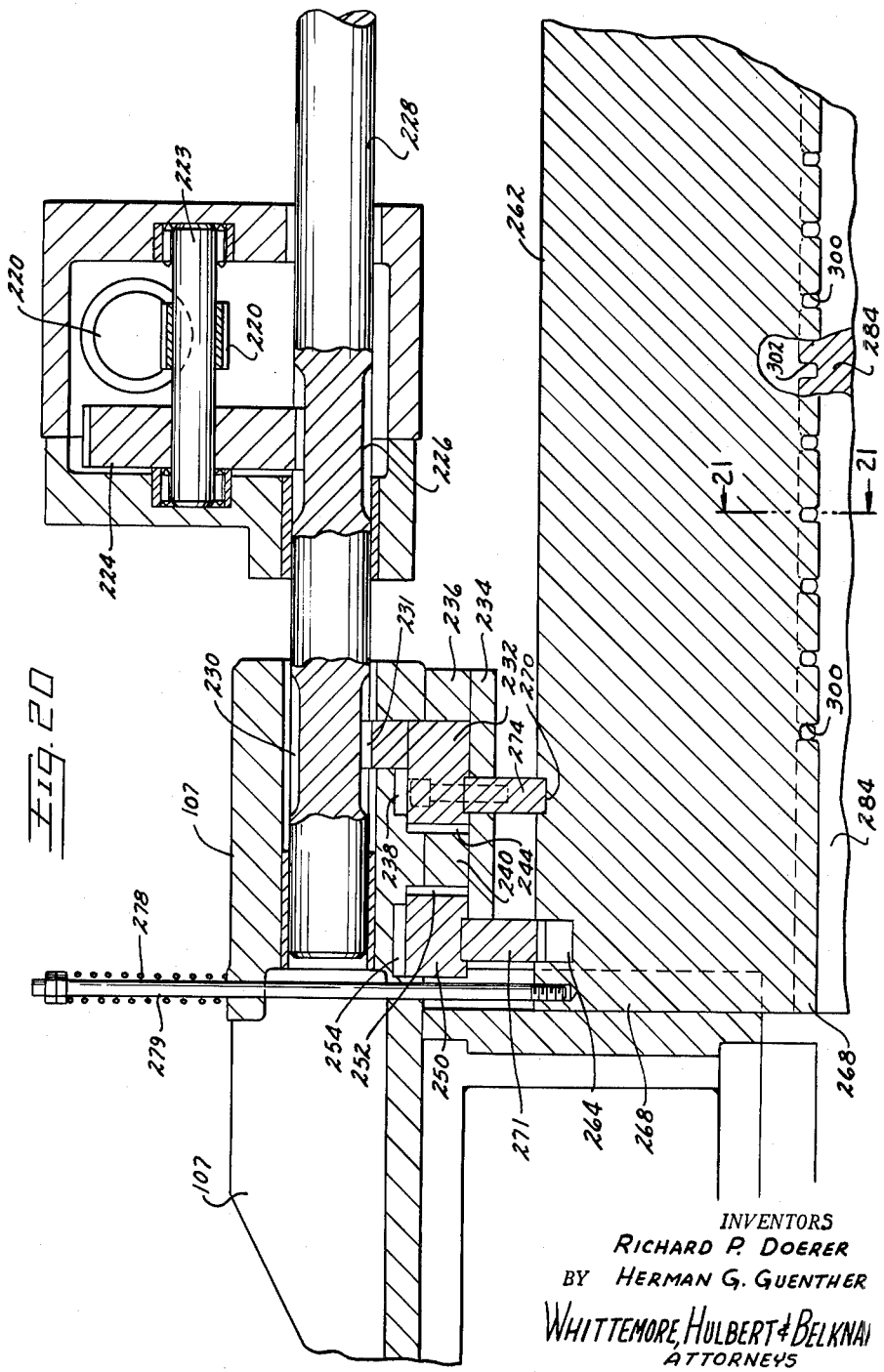

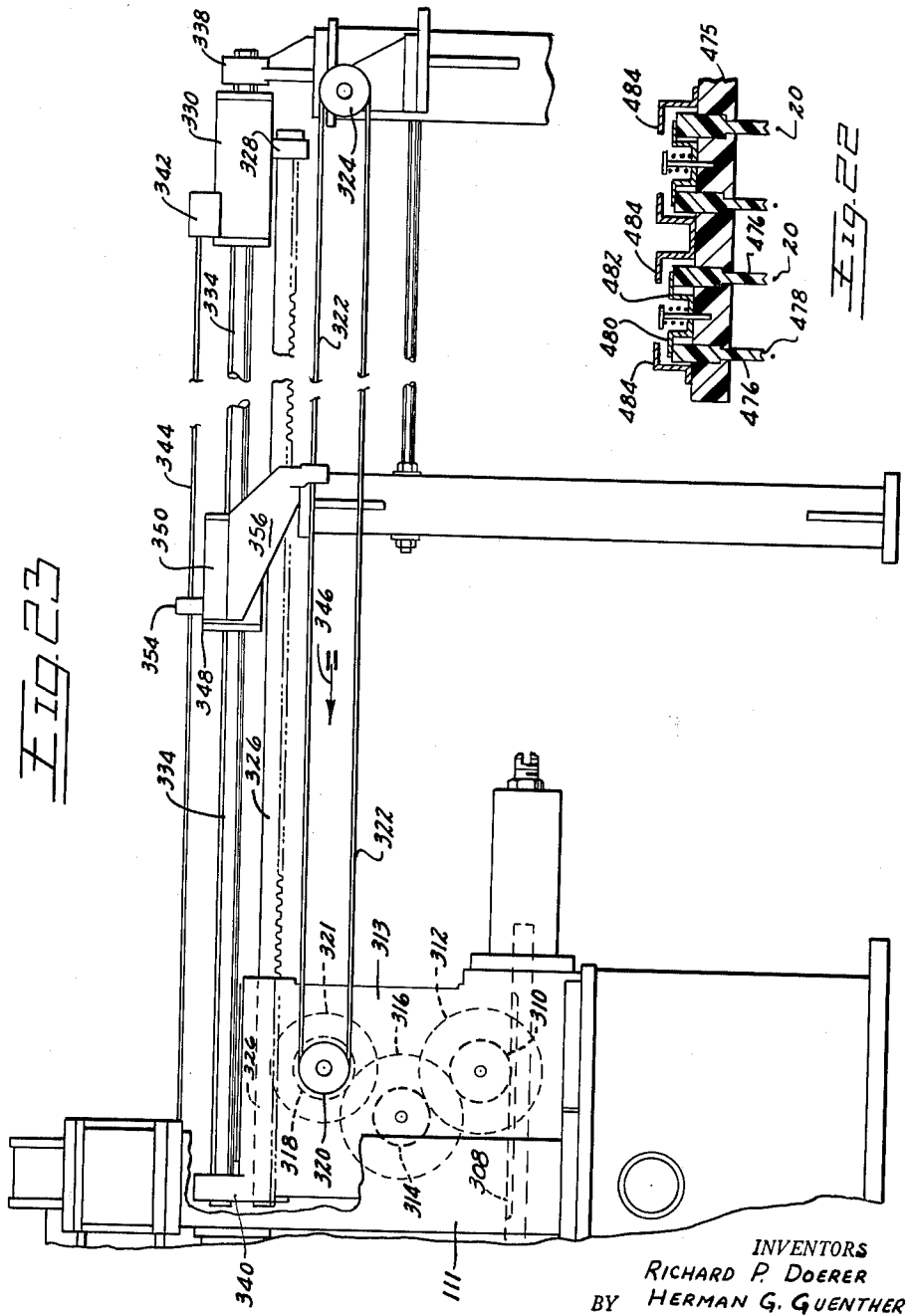

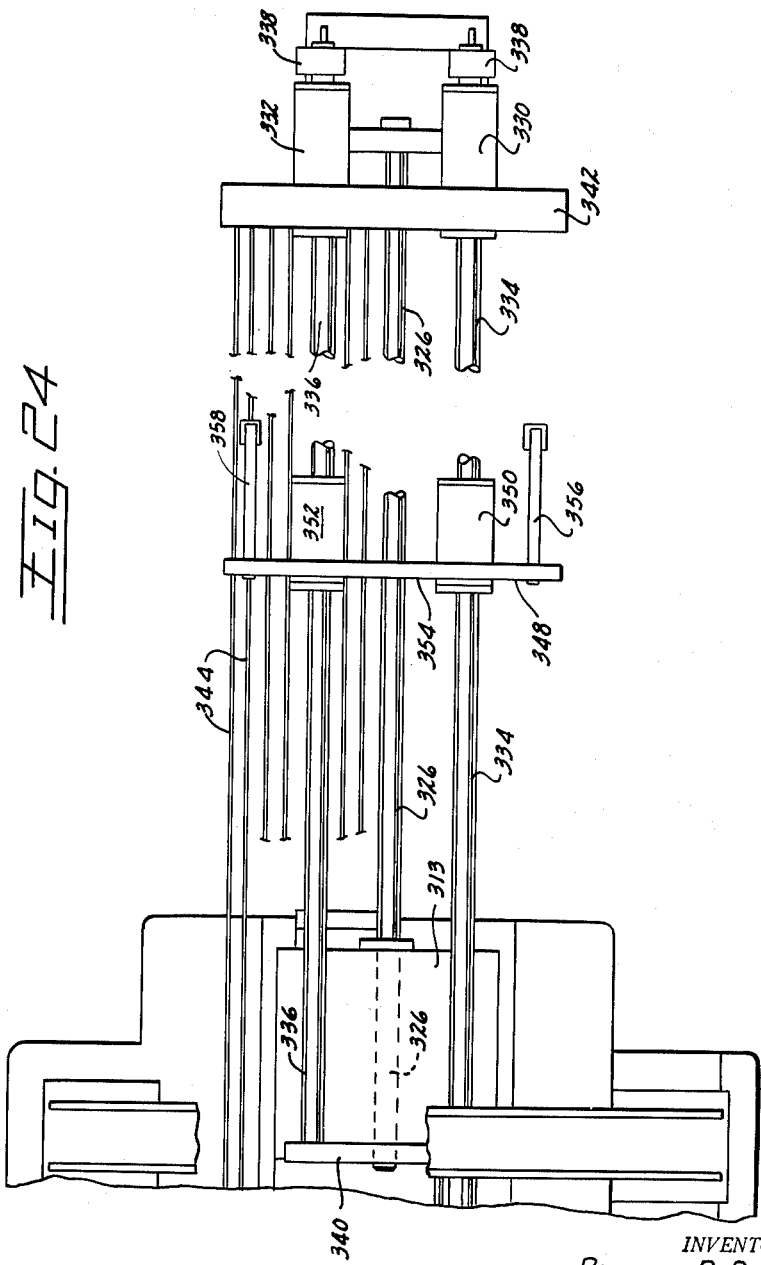

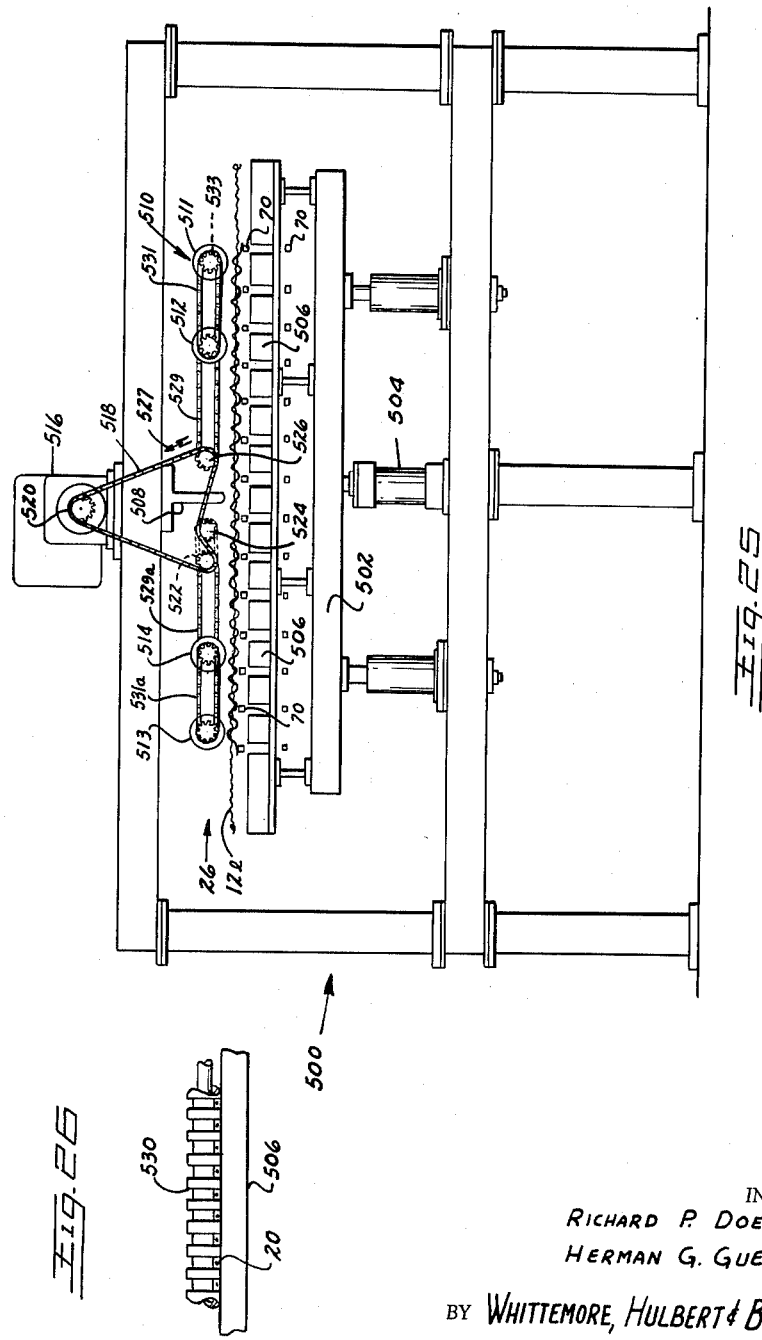

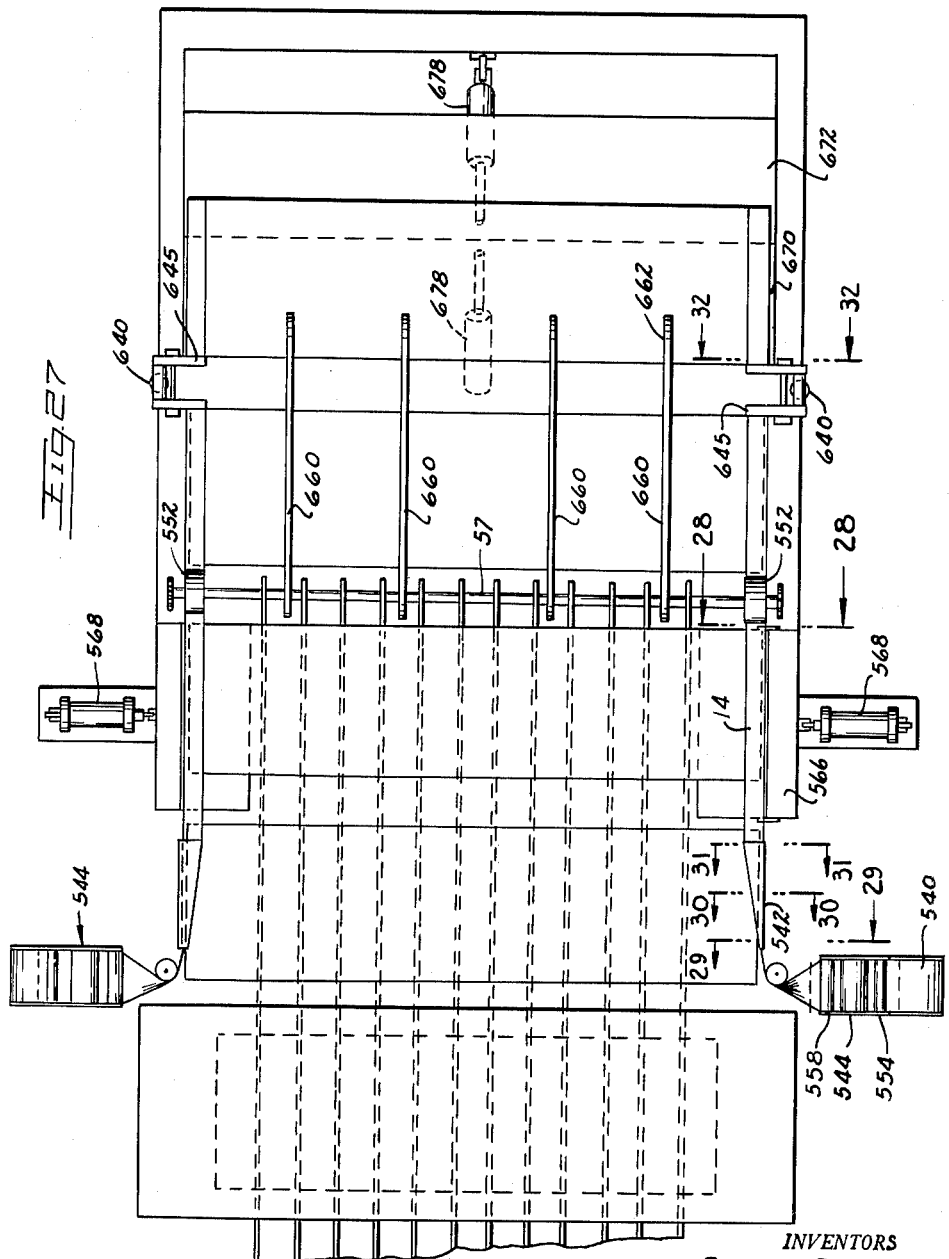

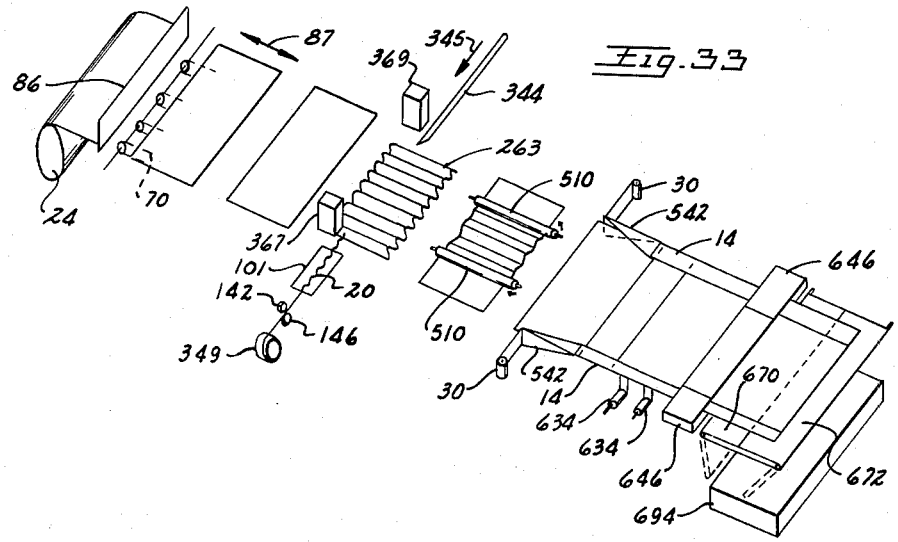
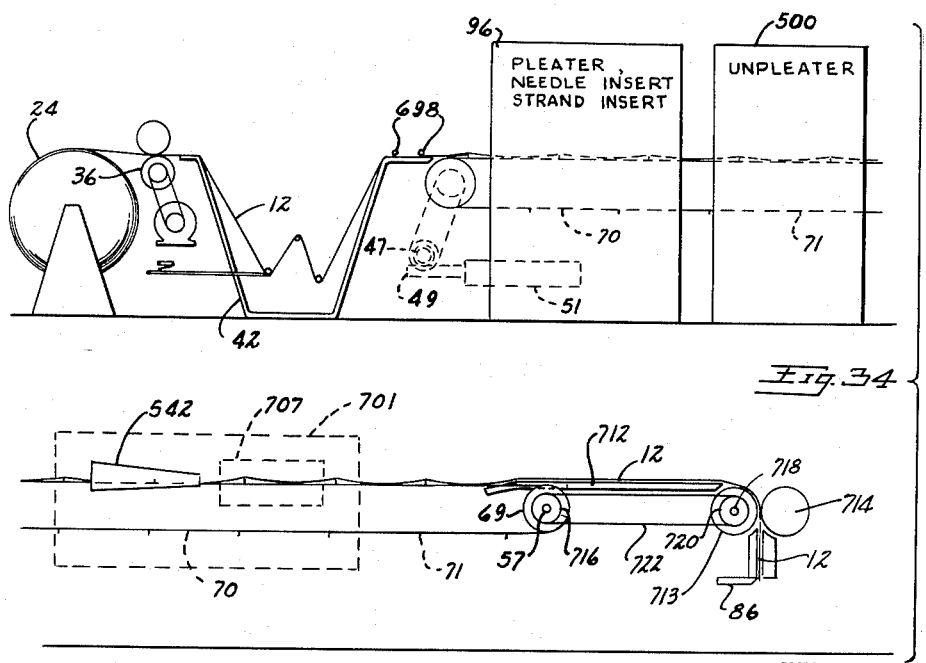

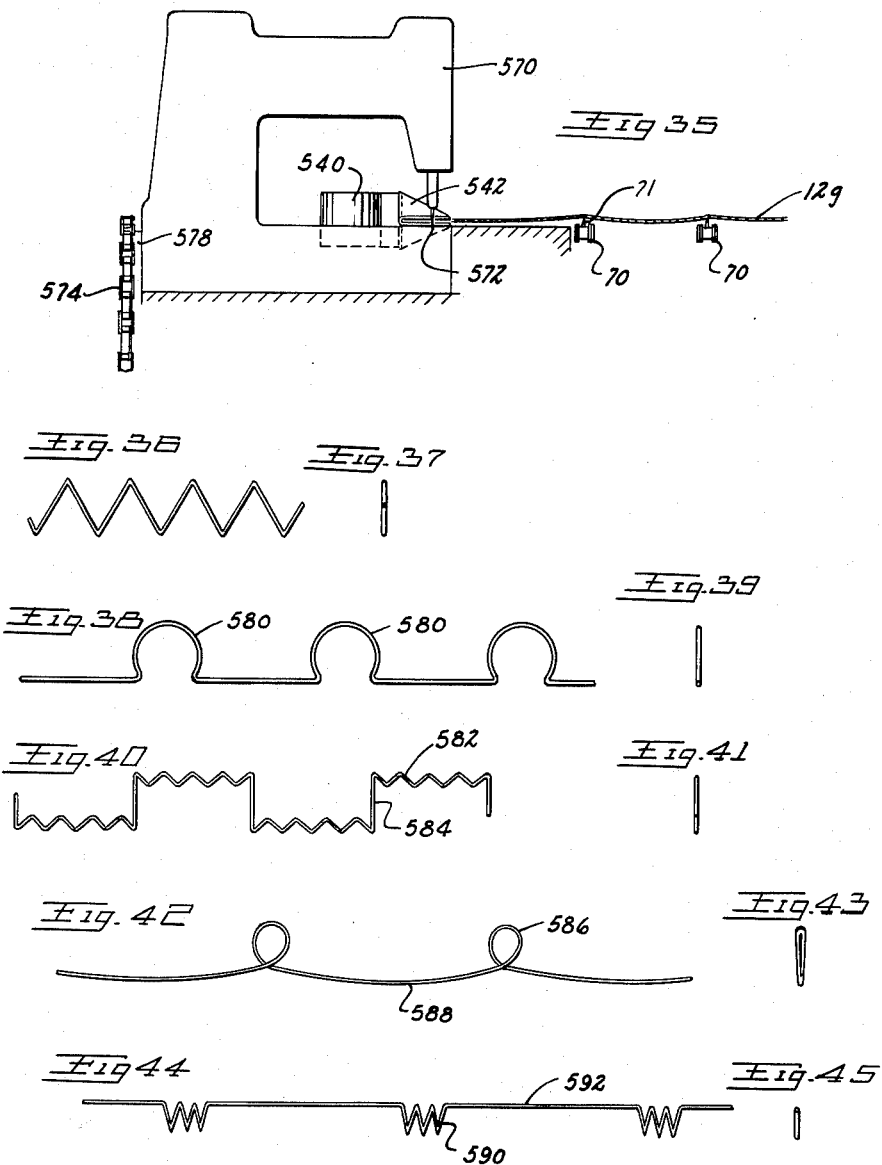

United States Patent Office 3,198,217
Patented Aug. 3, 1965

3,198,217
METHOD AND APPARATUS FOR MANUFACTURING REINFORCED FABRIC PANELS
Richard P. Doerer, Ypsilanti, and Herman G. Guenther, Detroit, Mich., assignors to Van Dresser Specialty Corporation, Warren, Mich., a corporation of Michigan
Filed June 23, 1960, Ser. No. 38,402
17 Claims. (Cl. 140—3)

This invention relates to a method and apparatus for manufacturing reinforced fabric panels, including a novel method and apparatus for threading reinforcing strands such as wires into a web of fabric material, as for example burlap.

Conventionally reinforced fabric panels of the instant type are manufactured by forming pleats in a web of fabric material, inserting a single wire reinforcement strand transversely through one area of each fabric pleat, advancing the material across the direction of wire travel to present a new pleat area to the wire supply, inserting a second wire reinforcement strand transversely through the newly presented pleat area, and alternately repeating the "fabric advancing" and "strand insertion" operations until the desired number of strands have been inserted into the fabric material. A panel may have many reinforcement strands therein, as for example eighteen, and the various "advancing" and "insertion" operations must be repeated many times with such a panel (eighteen times in the example).

In the usual arrangement each wire reinforcement strand is fed into the fabric panel from the same source of wire supply, and it is not possible to vary the characteristics of the wires in different portions of a given panel. For example, it is not possible to vary the gage of the wire or its configuration throughout different portions of a given panel.

The usual arrangements are also disadvantageous because they can only produce reinforced panels with straight wires, i.e. the wires cannot be given such undulatory or serpentine configurations as would make for an improved fabric reinforcement action in certain installations.

One object of the present invention is to provide a novel method and mechanism for manufacturing a strand-reinforced fabric panel wherein a plurality of strands can be simultaneously introduced into the panel.

Another object is to provide a novel method and mechanism for mass producing strand-reinforced fabric panels, wherein each of the reinforcement strands for a given panel is taken from a separate source of supply rather than from a common source of supply.

A further object of the invention is to provide in one form of the invention an improved apparatus which can be operated to introduced one or more reinforcement strands into a fabric panel, either simultaneously or in predetermined timed sequence.

Another object is to provide a method and mechanism as above specified, wherein the gage of each reinforcement strand may be pre-selected or varied to meet different product requirements.

Another object of the invention is to provide a method and mechanism for manufacturing reinforced fabric panels wherein selected ones of the reinforcing strands may be given undulatory or serpentine configurations of desired contour.

An additional object of the invention is to provide a method and mechanism for manufacturing reinforced fabric panels, wherein the fabric may be supplied from a large roll and automatically cut to panel lengths as part of a timed cycle involving the operation of inserting the reinforcement strands into the fabric panels.

A further object is to provide a method and mechanism for mass producing reinforced fabric panels, wherein a novel needle feeding and strand feeding arrangement is utilized.

Another object of the invention is to provide a method and mechanism for manufacturing reinforced fabric panels, wherein novel arrangements are utilized to form pleats in the fabric, form knots in the ends of the reinforcing strands, and form shields or coverings around the strand knots.

An additional object of the invention is to provide a mechanism comprising a series of stations for fabric cutting, fabric pleating, strand-feeding, strand knotting, and fabric stretching, the arrangement being such that the fabric material is enabled to progress smoothly through each station without danger of buckling, jamming, or otherwise moving out of desired position.

A further object of the invention is to provide a method and mechanism for mass producing a reinforced fabric panel of superior quality and purchaser acceptance.

Other objects of this invention will appear in the following description and appended claims, reference being had to the accompanying drawings forming a part of this specification wherein like reference characters designate corresponding parts in the several views.

In the drawings:

FIGURE 1 is a plan view of a strand-fabric article formed by the apparatus shown in FIG. 3;

FIG. 2 is a sectional view taken on line 2—2 in FIG. 1, with the left hand portion of the illustrated article enlarged to better show the section;

FIG. 3 is a plan view schematically showing an apparatus of the present invention, together with the positions of certain fabric panels as they are advanced therethrough;

FIG. 4 is an elevational side view of the FIG. 3 apparatus;

FIG. 5 is a perspective view of a conveyor drive mechanism employed in the FIG. 3 mechanism;

FIG. 6 is a view taken substantially on line 6—6 in FIG. 4;

FIG. 7 is a view taken substantially on line 7—7 in FIG. 4;

FIG. 8 is an enlarged sectional view taken on line 8—8 in FIG. 6;

FIG. 9 is a sectional view taken substantially on line 9—9 in FIG. 8;

FIG. 10 is a sectional view taken on line 10—10 in FIG. 8;

FIG. 11 is an enlarged sectional view taken along line 11—11 in FIG. 6;

FIG. 12 is an enlarged sectional view taken on line 12—12 in FIG. 6;

FIG. 13 is an elevational view taken in the direction of arrow 13 in FIG. 12;

FIG. 14 is a sectional view taken substantially on line 14—14 in FIG. 12;

FIG. 15 is a sectional view taken substantially on line 15—15 in FIG. 6;

FIG. 16 is an enlarged elevational view showing a pleater structure employed in the FIG. 7 mechanism;

FIG. 17 is a diagrammatic view showing operating components of the FIG. 16 mechanism in position preparatory to pleating operations;

FIG. 18 is a diagrammatic view showing operating components of the FIG. 16 mechanism in position at the start of a pleating operation;

FIG. 19 is a top plan view of the FIG. 16 pleater mechanism;

FIG. 20 is a sectional view taken substantially on line 20—20 of FIG. 19;

FIG. 21 is a sectional view on line 21—21 in FIG. 20, but taken after insertion of a needle structure and wire strand through the pleater elements;

FIG. 22 is an enlarged sectional view taken on line 22—22 in FIG. 7;

FIG. 23 is an enlarged elevational view of a needle-feeding structure employed in the FIG. 3 mechanism;

FIG. 24 is a top plan view of the needle-feeding structure shown in FIG. 23;

FIG. 25 is an enlarged view taken on line 25—25 in FIG. 4;

FIG. 26 is a fragmentary view taken in the direction of arrow 26 in FIG. 25;

FIG. 27 is a top plan view of a portion of the FIG. 3 mechanism;

FIG. 28 is a sectional view taken on line 28—28 in FIG. 27;

FIG. 29 is a sectional view taken on line 29—29 in FIG. 27;

FIG. 30 is a sectional view taken on line 30—30 in FIG. 27;

FIG. 31 is a sectional view taken on line 31—31 in FIG. 27;

FIG. 32 is a fragmentary sectional view taken on line 32—32 in FIG. 27;

FIG. 33 is a perspective illustration showing the operations performed on a fabric panel by the FIG. 3 mechanism as it travels therethrough;

FIG. 34 is a schematic view taken in the direction of FIG. 4 but showing an alternate thereto constructed according to the invention;

FIG. 35 is a view of a stitching mechanism which may be employed in the FIG. 3 embodiment in lieu of the stapling mechanism shown in FIG. 28; and FIGS. 36 through 45 are elevational and end views illustrating various configurations which the undulatory strand might take in lieu of the strand configuration shown in FIG. 1.

Before explaining the present invention in detail, it is to be understood that the invention is not limited in its application to the details of construction and arrangement of parts illustrated in the accompanying drawings, since the invention is capable of other embodiments and of being practised or carried out in various ways. Also, it is to be understood that the phraseology or terminology employed herein is for the purpose of description and not of limitation.

Referring to the drawings, and particularly to FIGS. 1 and 2, there is shown an insulator pad or panel 10 comprising a length of burlap 12 having its edge portions disposed within folded strips of paper 14. The paper strips extend beyond the edges of the burlap and are turned onto the upper face of the burlap as shown at 16 in FIG. 2. The turned edge portions 16 are suitably secured to the burlap, for example by gluing, stapling or sewing.

In order to reinforce the FIG. 1 panel there are provided a number of strands of wire 20, each of the strands being preferably undulatory or spiral in configuration as shown in FIGS. 1 and 2. An undulatory reinforcing strand has the advantage that it will yield or elongate when a force is applied normal thereto so as not to pull remote portions of the burlap. Additionally, an increased area of reinforcement is provided by the undulating strand as compared with the area of reinforcement provided with a straight strand; as a result when panel 10 is utilized as an insulator pad in a seat cushion the presence of the wires is not felt by the seat occupant and the reinforcement properties are enhanced as compared with pads employing straight reinforcing wires.

In order that the ends of reinforcing strands 20 do not unduly project from the surface of the burlap the reinforcing strands are preferably knotted at their ends as shown at 22 in FIG. 1. By utilizing paper webs 14 as shown the wire knots are shielded so as not to form sharp projections which might prove a safety hazard in handling of the panels and which might undesirably lock adjacent panels together when they are stacked on one another.

It will be noted that several operations are required to form the article shown in FIGS. 1 and 2. Thus, the burlap must be cut to size, the various strands 20 must be given their undulatory configurations, the undulatory strands 20 must be threaded through the burlap, the end portions of the wire strands must be knotted as at 22, the paper webs must be introduced onto the burlap-strand assembly and folded therearound, and the entire assembly adhered together as at 18.

In the threading of strands 20 through the burlap considerable difficulty has been experienced in attaining a high speed movement of the strands entirely through the burlap, it being noted that the leading ends of the wire strands have a tendency to be deflected by the burlap fibers, so as to jam the machine or otherwise provide an unsatisfactory product. Therefore, under the present invention, a special mechanism has been devised to hold the burlap in a pleated condition and guide the undulatory strands 20 during their insertional movement through the burlap fibers. After the wire strands have been inserted through the burlap and the ends thereof knotted, or looped, as at 22, the pleated assembly is passed through a stretcher device for smoothing the article out to its substantially flat FIG. 2 configuration.

Various operations which may be utilized to form and assimilate the FIG. 1 articles are as follows:

(1) Cutting of burlap web to predetermined panel length (2) Feeding the burlap panels into a wire strand-insertion mechanism or spacing (3) Fabric panel pleating (4) Feeding the wire strands from the wire supply (5) Strand spiraling or undulating (6) Knotting of the wire ends (7) Flattening the fabric panel (8) Glue application to paper edges (9) Introducing the paper webs onto the fabric panels and folding same about the panel edges

(10) Adhering the paper-panel assembly together

(11) Cutting the paper to correct size

(12) Discharging the paper-panel assemblies into shipping cartons.

The above-noted operations and mechanisms therefor are illustrated schematically in FIG. 33, and it is believed that a better understanding of the general features of the invention may be had by reference to that figure.

Referring to FIG. 33, the fabric burlap material is taken from a supply reel 24 and advanced beneath a vertically reciprocating cutter 86 which cuts it into individual panels of a predetermined dimension (in the arrow 87 direction). The conveyor means at 70 locates each panel at a predetermined point thereon, and introduces each panel into a pleater mechanism which automatically gives the panel a pleated condition as shown at 263.

While the panel is still in a pleated condition hollow pointed tubes or needles 344 are passed transversely through the pleats in the arrow 345 direction. Immediately thereafter the rolls 142 and 146 are rotated to drive undulatory wire strands 20 into the hollow needles. It will be noted that the wire strands are taken from supply reels 349 in non-undulatory conditions. The strand undulations are formed in the undulation-producing mechanism generally designated by numeral 101. FIG. 33 shows only one needle and one wire strand, but it will be appreciated from a study of FIG. 1 that in actual practice a multiplicity of the needle-strand arrangements are utilized.

It will be appreciated that hollow tubes 344 act as guides to permit the undulatory wire strands to be rapidly advanced into and through the panel pleats. When the strands have been advanced into the tubes (or while they are being advanced therein) the tubes are retracted from the pleats, leaving the undulatory strands embedded or extended within the pleats. The strands are then cut and knotted at both ends by automatic mechanisms 367 and 369.

After the knotting operations the panel-strand assembly (with the panel still in a pleated condition) is advanced into position beneath rollers 510 which rotate about fixed axes to iron out the panel pleats and return the panel to a flat condition.

The panel is then advanced through the space between two traveling paper webs 14 which are taken from supply reels 30 and folded about the fabric panel edges by means of the folder structure 542.

The fabric-wire strand-paper web assembly is subsequently advanced over the adhering mechanism shown in FIG. 33 as comprising the automatic stapling guns 634. The paper is at this time still in the form of a continuous strip, and the strip is therefore cut through at appropriate points by the automatic cutters 646.

As the last operation the complete panel assembly is passed onto the trap doors 670 and 672, which automatically swing down at a preappointed time to discharge the assembly into a shipping carton 694. When the carton is filled with a certain number or weight of panels it is replaced with an empty carton.

From the above brief description it is believed that general features of the invention will be apparent. However, for a more detailed understanding reference will now be made to the more detailed arrangements of features shown in FIGS. 3 through 32. For convenience of description the various components will be described in the general order in which they operate as the fabric panel is passed therepast.

SUPPLYING THE BURLAP

Referring to FIGS. 3 and 4, the burlap is supplied from a reel 24 and is trained over a feed roll 36 which is driven from a small electric motor 34. An idler roll 38 is spring loaded at 40 to maintain the burlap in driven engagement with the roll 36. The burlap is pulled through the rolls 36 and 38 and thence into a bin or trough structure 42 which merely serves as an accumulator space for maintaining a web supply for the web cut-off structure indicated generally by numeral 44.

Preferably trough structure 42 is provided with two fixed laterally extending guide rods 35 and a vertically movable rod 37. Rod 37 is carried on and between two arms 39 which extend along opposite lateral edges of trough 42. Arms 39 are fulcrumed on trunnions 33, and one of the arms is operatively engaged with the actuator of an electrical switch 43 which is electrically located to control energization of motor 34.

The arrangement of parts is such that as burlap is drawn from trough 42 motor 34 is automatically energized to replenish the burlap supply. In the illustrated embodiment feeding of the burlap from bin 42 is accomplished by a rubber-coated driver roll 46 and a rubber-coated idler roll 48. Preferably these rolls are spring-urged together as at 41 to maintain a sufficient frictional-pressure drive on the burlap during roll rotation periods.

In operation, as roll 46 draws burlap from trough 42 rod 37 tends to be raised up around the axes at 33. As rod 37 is raised its illustrated supporting arm 39 trips switch 43, thereby energizing motor 34 so as to cause a replenishment of the burlap supply in trough 42. The arrangement is such as to provide a uniform feeding of burlap through rolls 46 and 48 without undue strain on the burlap fibers and without need for expensive synchronizing mechanisms.

It will be noted from FIG. 5 that roll 46 is operatively driven from a gear 47 which meshes with a rack 49. Power for operating the rack is derived from a conventional fluid cylinder 51, preferably positioned at one side of the machine as shown in FIG. 5. The arrangement of cylinder 51 is such that when pressure fluid is admitted into its right end the rack is forced outwardly relative to the cylinder so as to act on slip clutch 75 and gear 47 for driving the pressure roll 46 in a clockwise direction (FIGS. 4 and 5). By this action the burlap is advanced a predetermined distance through the pressure rolls. A small friction drag device is shown at 46a, said device merely serving to prevent reverse movement of roll 46 during retraction of rack 49 toward cylinder 51. The drag device may consist of two blocks engaging opposite surfaces of the roll shaft, a pair of headed pins extended from one block through the other block, and compression springs surrounding the pins to urge the blocks toward one another so as to establish a frictional grip on the roll shaft. One of the blocks may be fixedly mounted so as to provide the desired drag on the shaft.

During rotation of roll 46 the sprocket 58 is rotated so as to drive the chain 60 a distance corresponding to the stroke of cylinder 51. Chain 60 in turn drives a sprocket 55 which is carried on the input portion of a conventional slip clutch 64. The output for clutch 64 is connected with a shaft 66 which carries the sprockets 68 as shown in FIG. 5. Each of sprockets 68 cooperates with additional sprockets 69 carried on a shaft 57 adjacent the downstream end of the machine for operatively mounting the conveyor chains 70. As will be apparent from a later description of the FIG. 4 mechanisms, chains 70 are of a length sufficient to carry the burlap from the burlap panel cutting station through a pleating station, needle insertion station, wire advancement station, needle retraction station, wire knotting station, and burlap unpleating station.

Referring again to FIG. 5, as the chain 60 is moved by the stroke of rack 49 the various sprockets 68 are rotated so as to advance the conveyor chains 70 a predetermined distance, as for example twenty-two inches. During this time the burlap supply from bin 42 is also being carried forward by a corresponding distance (twenty-two inches in the illustrative example) under the drive from roll 46. At completion of the outward stroke of rack 49 the shear blade 86 is operated to cut through the burlap to thereby provide a burlap panel 12a resting partly on the conveyor chains 70.

In the illustrated embodiment shear blade 86 is of a conventional construction and is operated from the electric motor 90. Preferably the shear motor is provided with a flywheel 92 and is operatively connected with the shear blade by a conventional crank-link means (not shown).

On the upstroke of shear blade 86 a limit switch is tripped to cause pressure fluid to be pumped into the right end of fluid cylinder 53 (FIG. 5). This cylinder is provided with a piston 59 having a rack extension 61 meshing with a gear 63 carried on the input side of a conventional slip clutch 65. The output from clutch 65 is connected with the shaft 66 for the various sprockets 68, and accordingly as pressure fluid is delivered to the right end of cylinder 53 the rack 61 will cause the sprockets 68 to be rotated to advance the chains 70 in the arrow 73 direction by an amount corresponding to the stroke of piston rod 59. During this advancing movement the clutch 64 (at the left end of shaft 66) will slip, such that no movement of roll 46 will occur. By this arrangement the conveyor chains 70 will serve to advance the cut panel 12a relative to the burlap supply to thereby provide a desired spacing between individual panels on the conveyor. This spacing is of course desirable in that it permits the various subsequent operations to be performed simultaneously on different panels, the overall effect being one of high-volume, low-cost production.

In summary, the cycle of motions involved in the burlap cutting-spacing operations begins with energization of cylinder 51. In an illustrative example, the cylinder is energized to simultaneously advance the roll 46 and chains 70 for a distance of twenty-two inches, to thereby advance the burlap supply past the upraised shear blade 86 and carry a previously cut panel 12b for a distance of twenty-two inches along the path of the conveyor chains 70. On the reverse stroke of rack 49 the slip clutch 75 and frictional device 46a hold the roll 46 motionless. During or before this reverse stroke the shear motor 90 is energized to quickly depress and then lift the shear blade 86 so as to cut the panel 12a to a twenty-two inch length. On the upstroke of shear blade 86 the cylinder 53 is energized to advance the rack 61 for thereby advancing the chains 70 to shift the panel 12a downstream by a predetermined amount, as for example eight inches. The rack 61 may then be driven into the cylinder 53 without transmitting motion to either the sprocket 68 or roll 46. The cycle is repeated by again energizing cylinder 51 as previously described. The chains are provided with suitable barbs 71 to maintain the burlap in fixed locations therealong.

In the illustrative example the burlap panels are each cut to a twenty-two inch length in the direction of conveyor travel, and adjacent panels are spaced from one another by an eight inch spacing. The panel length and spacing may of course be varied in accordance with different product sizes and operational conditions by merely varying the strokes of cylinders 51 and 53.

In the illustrated arrangement the strokes of the cylinders may be accurately controlled by means of the control structure shown in FIG. 4. The structure there shown comprises a first fluid cylinder 77 controlling the position of a pivotally mounted stop arm 79, and a second fluid cylinder 81 controlling the position of a second pivotally mounted stop arm 83. The stop arms have their operative ends located adjacent a rotary disc 85 carried on the sprocket 67. Sprocket 67 is driven from shaft 66 via a chain 89, the arrangement being such that during clockwise rotation of shaft 66 the disc 85 will be driven a distance corresponding to the stroke of the power device then operating (either cylinder 51 or cylinder 53).

Disc 85 is provided with a stop shoulder 91 which, during disc rotation sequentially strikes the two arms 79 and 83 to control the motion of the power devices. Suitable valved fluid supply lines are connected to cylinders 77 and 81 so as to maintain the stop arms 79 and 83 rigid at the times when the stop shoulder 91 strikes respective ones of the arms.

In an illustrative sequence of motions, with the stop arms in their FIG. 4 positions valve means (not shown) is operated to reduce the fluid pressure in cylinder 77 so as to permit operation of cylinder 51. Cylinder 51 operates until stop shoulder 91 strikes the stop arm 83, which is at that time backed up by the fluid pressure in cylinder 81; the action is such as to precisely control the stopped position of the disc. After disc 85 is stopped the fluid pressure within cylinder 81 is reduced, and cylinder 53 is then operated until the shoulder 91 again strikes arm 79 for causing the conveyor to remain motionless until the next energization of cylinder 51.

Preferably the circumference of disc 85 is the same as or bears a predetermined relation to the total stroke of the conveyor chains 70 (i.e, thirty inches in the illustrative embodiment), and the trip arms 79 and 83 are located at suitable points around the circumference of disc 85 so as to energize the fluid cylinders after the correct rack travels. By this arrangement the panel length and spacing can be varied by changing the locations of mechanisms 77 and 81 without other change in any of the components.

The illustrated arrangement is such that the fabric panels are each formed of a predetermined length and with a predetermined spacing. Also, the leading edge of each panel occupies the same position irrespective of the adjusted panel length-spacing relationship. This "leading edge positioning" is of advantage in that it allows the panels to be properly positioned with respect to the strand-feeding mechanisms to be described hereinafter.

STRAND FORMATION AND INSERTION MECHANISM

(Figs. 8 through 11)

It will be noted from FIGS. 3 and 4 that the chains 70 extend from the cut-off structure 44 entirely through many of the remaining components of the machine. Thus, the conveyor chains 70 constitute the mechanism for successively conveying the cut fabric panels through various ones of the stations to be described hereinafter. As each panel is moved by the chains 70 it initially passes into a pleater station 96, the function of which is to distort the panels into a wave-like configuration as shown at 263 in FIG. 33 for permitting the wire strands 20 to be threaded therethrough.

Referring to FIG. 3, the wire strands are supplied from individual reels 98, there being one reel for each strand to be threaded into the panel. The illustrated machine is designed to simultaneously thread eighteen wire strands into the panel, and there are therefore employed eighteen supply reels 98 for the individual strands. Each strand as it comes from its reel is not undulatory in configuration, and it must therefore be given its undulatory shape prior to threading through the panel. The mechanism for giving each wire strand its undulatory configuration is shown in FIGS. 8 through 10.

Referring to FIG. 9, there is shown a fixed housing structure 100 having moutning means 102 in each of its end walls 104 for fixedly supporting the through shaft 106. Rotatably supported on shaft 106 are eighteen independently lever-type movable supports 108 (one for each wire strand). Each lever is individually biased downwardly about the shaft 106 by means of a compression spring 110, the force of which is regulated by a set screw 112. The intermediate portion of each lever is cut away to provide a recess 114 which receives the portion 116 of a bracket structure 118. Each recess 114 is closed by a plate 120, and a stub shaft 122 is extended through each bracket portion 116 and lever 108 to mount the bracket for pivotal movement relative to the lever. Each bracket 118 comprises a central plate 124 and two side plates 126, the three plates being secured together by machine screws 128. Plate 124 is cut away at 130 for accommodating the rotary disc structures 132. Each disc structure is rotatably mounted on a stub shaft 134 by means of the roller bearings 136. Lubricant is supplied to the bearings through fittings 135 and communicating passages 133. The fittings are carried on the two endmost brackets 118 and the passages 133 are formed in the stub shafts 134, the theory being such that lubricant is pressure fed to each set of bearings. One of the plates 124 in each bracket may be provided with an O-ring seal to contain the lubricant.

Each disc structure 132 comprises a gear portion 140 and a smooth-edged portion 142. The various disc structures 132 are positioned with their gear portions 140 meshed with similar gear portions 144 of subjacent disc structures, and with their roller portions 142 aligned with the roller portions 146 of the subjacent disc structures. Each roller portion 146 is provided with a peripheral groove 148, the arrangement being such that a wire strand is received within the groove 148 as a tight pressure fit therein. In this connection the depth of groove 148 is slightly less than the diameter of the wire so that the edge portion of roller 142 is enabled to have a pressure engagement with the wire surface under the force of spring 110 (FIG. 8).

Referring for the moment to FIG. 7, the drive for gears 140 and 144 is shown to include a fluid cylinder 150 having a piston rod 152 provided with a rack portion 154 meshed with the gear 156. By a series of distance multiplying gears 158 through 164 a multiplied movement is transmitted to chain 166. Chain 166 drives a shaft which carries a series of gears 170 (eighteen in the illustrated embodiment), the arrangement being such that each gear 170 meshes with two of the gears 144 so as to drive them clockwise (in FIG. 7). The gears 144 are in mesh with the gears 140 as previously described, and the arrangement is therefore effective to drive the individual wire strands in the arrow 172 direction (FIG. 8). Suitable one-way clutch means is located in the drive from rack 154 and chain 166 such that reverse movement of the rack is precluded from disturbing the positions of gears 144.

It should be noted that each spring 110 (FIG. 8) is adjusted to deliver a force to the disc 142 much greater than that necessary for merely ensuring a frictional drive to the wire strand. The rollers 142 function not only as drive elements, but also as anti-twist elements for preventing entanglement of the wire strand material on the supply reels. In this connection, the spiraling or undulating mechanism shown in FIG. 11 imparts a torsional stress onto each wire strand as it moves therethrough, and the rollers 142 are designed to absorb this torsional stress and prevent it from working back to the supply reels in such manner as to cause entanglement, distortion or fracture of the wire supply. The loading of springs 110 may be varied in accordance with different operating conditions, but in a particular illustrative installation the springs are selected and loaded to each deliver a force of several hundred pounds onto each lever 108. The levers and brackets are positioned flatwise against each other to conserve space and thereby permit the wire strands to be fed into the mechanism in close proximity to one another according to the desired spacing in the finished article.

It will be noted that each bracket 118 carries two rollers 142. By this arrangement the anti-twist force applied to each wire strand is maintained sufficient to prevent wire entanglement. Also, the arrangement ensures that a large force will be applied onto the strand, irrespective of variations in cross-sections therealong. In this connection it will be noted that if the portion of the strand passing through the rightmost roller 142 (FIG. 8) were to be enlarged then the bracket 118 could shift slightly in a counterclockwise direction about the axis of the stub shaft 122 so as to momentarily shift the relatively high pressure onto the leftmost roller 142 in a manner to compensate for any loss of pressure through the leftmost roller 142.

As above noted, the wire strands 20 are preferably taken from conventional supply reels 98. In the event that any tangling of the wire occurs in the reels it is desirable that the machine be automatically de-energized. Therefore in the illustrated embodiment there is preferably provided the machine cut-off or safety mechanism 131 shown in FIGS. 3, 4 and 7.

Referring to FIG 4, the safety mechanism there shown comprises a stationary casing 133, in which is located an electric motor 135. Extending within the casing is a rack 137 which is moved bodily up by the motor via the motor driven gear 139. Rack 137 carries a horizontal bar 141 which extends over the various wire strands as they are fed into housing 100. The arrangement of parts is such that bar 141 is powered upwardly by motor 135 but is thereafter free to drop downwardly under gravitational forces (unless prevented by wire entanglements at any of the wire supply reels 98).

In an illustrative cycle, motor 135 powers bar 141 upwardly, and cylinder 150 is energized to feed the wires into housing 100. This action places the wires against the undersurface of bar 141, and the weight of the bar is then sufficient to cause it to lower and thus pull additional wire material from supply reels 98. In the event of a tangled condition in any of the supply reels the wire from that reel will be in a taut condition, and the bar 141 will be prevented from gravitational lowering.

The bar is suitably located to operate a control switch (not shown) at the downward limit of its movement, said switch being suitably connected in the electrical system for controlling the machine cycle. Thus, any failure of bar 141 to lower at the dictated time will halt the cycle. In this manner the attendant will be appraised of any entanglements in the wire supply and will be able to correct the condition without such scrap losses as would be difficult to detect by direct visual observation.

The drawings show a particular arrangement and construction of the safety mechanism 131. However, it will be appreciated that other arrangements can be operatively employed. In one actual installation a conventional lift truck has been operatively utilized (with the forks thereof replaced by bar 141).

Referring now to FIG. 8 it will be seen that as each wire strand 20 is fed from the leftmost set of rollers 142 it passes into the undulating mechanism 101 shown in detail in FIG. 11. The undulating mechanism comprises a base 174 having a series of eighteen separate block elements 176 adjustably secured thereon by means of set screws 178 extending through a cover plate 180. Cover plate 180 extends laterally over all of the various blocks 176 and is fixedly secured to the base 174 by a plurality of spaced screws 182. Spacers (not shown) are provided at the ends of the base and cover plate to hold the two structures in the spaced positions illustrated in FIG. 11.

The downstream face of each block 176 is provided with an enlarged bore which lockingly receives the end portion of a former rod 186. Each rod 186 is provided with a straight groove portion 188 which leads to a spiral groove portion 190, the arrangement being such that as the wire strand is fed into the groove 190 it is twisted into a spiral undulatory configuration. Former rod 186 extends through a tubular member 192, the internal surface of which cooperates with the groove 190 in forming a spiral strand. In order to minimize wear on the internal surface of tube 192 the tube preferably has a rotatable fit on the rod 186, the arrangement being such that different portions of the tube surface are presented to the spiral groove 190 during successive strand-spiralling operations so as to prolong the tube service life. In this connection it will be appreciated that the strand-spiralling operations are carried out at comparatively high operational speeds, and the abrasive forces on the tube are extensive.

The spiral groove 190 in fixed rod 186 registers with a spiral groove 194 of a fixed rod 196. Each rod 196 is locked within block 198 by means of a set screw as shown in FIG. 11. The upper face of each block 198 is provided with a pair of V-shaped grooves 200 which form cam surfaces for cooperation with the conical end portions of set screws 202. It will be understood that adjustment of the individual blocks 198 in the arrow 204 directions may be obtained by proper adjustment of the screws 202. Thus, as the rightmost screw 202 is turned further into its groove than the leftmost screw 202, the block 198 will be adjusted to the left; conversely if the leftmost screw 202 is turned further down the block 198 will be adjusted to the right. The purpose in the arrow 204 adjustment is to regulate the position of block 198 so as to maintain a minimum clearance thereof with respect to tube 192 and rod 186. The right end portion of each block 198 carries a cut-off block 206 which defines a face 208 located to be traversed by a reciprocating cutter 210 (FIG. 12). It will be understood that at a predetermined point in the operating cycle the cutter 210 is adapted to be moved downwardly for cutting off a length of the formed spiral strand.

It will be seen from FIG. 11 that the major diameter of the groove 194 is slightly greater than the major diameter of the groove 190. Also the pitch of the groove 194, as denoted by dimension 214, is greater than the pitch of groove 190, as denoted by dimension 215. These differences are designed to accommodate the tendency of the wire to spring back after its deformation in the groove 190. Thus, the contour of groove 194 corresponds with the contour of the spiral strand as it exists in the free state following its formation in the groove 190. The arrangement is such that the wire in groove 194 is unstressed so that a precise length of wire is enabled to be discharged past the block 206 during each operating cycle. In this manner the subsequent operations on the strand are more accurately performed and the resultant product (FIGS. 1 and 2) is more uniform.

The FIG. 11 spiralling or undulating mechanism may be employed with some or all of the FIG. 8 wire feeders, i.e. some of the wires may be fed into the fabric panel without being spiralled, and some of the wires may be given different undulatory shapes from that produced by the FIG. 11 mechanism. Also, some of the wires may be of a relatively heavy gage, and some may be of a relatively light gage in accordance with different characteristics to be given to different areas of the final product.

FABRIC PANEL PLEATING
(FIGS. 16 through 21)

Referring to FIGS. 6 and 7, it will be seen that after the individual wire strands have been fed through the FIG. 11 spiral-forming mechanisms (by the FIG. 8 drive rollers) they are forced into a pleater station 96, which as previously noted functions to maintain the burlap panel in a pleated condition during insertion therethrough of the wire strands.

The pleater operation may best be visualized by referring to the schematic illustrations in FIGS. 17 and 18. As shown in FIG. 17, the burlap panel 12c is supported on the conveyor chains 70 such that the panel can be carried toward the pleater. Disposed beneath and between the various chains 70 are the elongated lower pleater elements 284, which are each of a length corresponding to the cut length of the panel (arrow 87 direction in FIG. 33) plus an appropriate factor or margin. The various pleater bars 284 are carried on an elevator 288, and when the elevator is raised from its FIG. 17 position to its FIG. 18 position the various pleater bars 284 are powered upwardly between the various chains 70 so as to lift the burlap panel from the chains as shown in FIG. 18. In its FIG. 18 position the panel is located very closely adjacent the lower edges of an upper set of pleater bars 262. There is provided a center pleater bar designated by numeral 276 and other pleater bars on either side thereof. The bars at the left of center bar 276 are suitably notched at their upper edges to form cam surfaces for causing the bars to be cammed downwardly by leftward movement of the overlying bar 271. The pleater bars at the right of center bar 276 are suitably notched at their upper edges to form cam surfaces registering with cam surface 272 of the overlying bar 274, the arrangement being such that the right set of pleaters 262 are cammed downwardly by rightward movement of bar 274.

In the preferred operation the operator bars 271 and 274 are moved simultaneously in opposite directions so as to cross one another and sequentially depress the various pleater bars in the upper set of bars, beginning from the center pleater bar 276 and continuing laterally outwardly with depressions of successive bars on both sides of the center pleater bar. The arrangement is such that initially the pleater bar 276 is depressed downwardly so as to cooperate with the subjacent pleater bars to tightly grip the center area of the burlap panel. Therefore, as the other pleater bars come down successively the panel will maintain its position relative to the longitudinal center line of the machine such that very little lateral bodily shifting of the panel will occur. Since the outermost pleater bars will not come down until the innermost pleater bars have been depressed there will be no excessive strain placed on the burlap such as might tear or deform the burlap fibers.

The above brief description is intended to explain the general mode of operation of the fabric panel pleating structure. For a more detailed understanding of a construction actually utilized in a particular embodiment, reference is made to FIGS. 6, 16, 19 and 20.

Referring for the moment to FIG. 6, the pleater station comprises two ribbed beams 107 and 109 supported at their ends by pillars 111. A bridge structure 113 extends across the space between beams 107 and 109 to rigidify them and form a support for a housing 115.

The pleater mechanism is shown in greater detail in FIGS. 16, 19 and 20. Power for the pleating operation is provided by a fluid cylinder 216 mounted on a bar 117 (FIG. 6) and having a piston rod 218. As shown in FIGS. 16 and 19, rod 218 extends into housing 115 and carries a rack 220 which drives a small pinion 222 and a larger pinion 224 via a shaft 223. Pinion 224 in turn drives another spline gear 226 formed in a portion of the elongated shaft 228. Only a portion of the shaft 228 is visible in FIGS. 19 and 20, the non-illustrated portion extending to the other end of the pleater structure for operation of actuator elements similar to those shown in FIGS. 16, 17 and 19. The arrangement is such that the power of piston rod 218 is applied at one portion of the shaft 228, and the shaft is utilized to distribute this power to opposite end portions of the pleater elements for obtaining a smooth jam-free operation thereof in a minimum time period (two seconds or less). Each end portion of the shaft 228 is provided with a gear portion 230 which meshes with the teeth 231 on a rack 232. Fixed guide structures are provided at 234, 236, 238 and 240 for restricting the rack 232 to rectilinear motion. A side surface of the rack is provided with a set of teeth 244 along substantially its entire length for meshing engagement with the teeth of a pinion 246 carried on an idler shaft suitably journalled in the fixed housing.

The function of pinion 246 is to transmit reciprocation of rack 232 to a second rack 250. For this purpose rack 250 is provided with teeth 252 along its side surface. A fixed guide structure is provided at 254 for restricting rack 250 to rectilinear motion. It will be understood that pinion 246 is effective to reciprocate the rack 250 in a different direction than the rack 232. Thus, while rack 232 is moving in the arrow 258 direction, the rack 250 will be moving in the arrow 260 direction, and vice versa.

Racks 232 and 250 serve as actuators for the pleater elements 262, each of which is constructed as a horizontally extending upright flat plate of a length somewhat greater than the largest cut length of panel to be handled by the apparatus. In a given installation the largest panel cut length is approximately twenty-eight inches, and the pleater elements 262 each have a length slightly in excess of this figure. Each pleater element is provided with two slots 264 immediately adjacent each lateral edge portion 268 (only one edge portion 268 being visible in FIG. 20). Additionally, each pleater element is provided with two other slots 270 spaced inwardly of the slots 264. It will be understood that FIG. 20 shows only one end portion of an individual pleater element, but that additional slots corresponding to slots 264 and 270 are provided in the other end portion. Each slot 264 slidably receives the extension 271 of the rack 250, and each slot 270 slidably receives the extension 274 of the rack 232.

The arrangement of pleaters is such that the centermost pleater occupies the position designated by numeral 276 in FIG. 16. In the FIG. 16 position of the elements all of the pleater elements 262 are in their depressed positions, the rack 232 is in its rightmost position of movement, and the rack 250 is in its leftmost position of movement. Energization of the fluid cylinder to draw rack 220 to the left is effective through the gearing 222, 224 and 226 to draw rack 232 to the left in FIG. 16. During this leftward movement the rightmost pleater element 262 is allowed to move upwardly under the influence of the biasing springs 278, said springs being shown as compression springs encircling the rods 279 carried by the pleater elements. Continuation of the rack 232 movement is effective to successively raise the other pleater elements.

It will be noted that slots 264 in the pleater elements to the right of position 276 are ineffective as cam devices, their only purpose being to provide a clearance for rightward movement of the rack 250. Thus, as the rack 232 is moved to the left, the rack 250 is simultaneously moved to the right through the gearing 246. As the rack 250 moves to the right the springs 278 for the leftmost pleater elements (not shown in FIG. 16) are effective to raise the pleater elements to their uppermost positions.

When cylinder 216 is energized to drive rack 220 back toward its illustrated position the cam extensions 271 on racks 232 become effective to depress the right set of pleater elements against the action of their biasing springs 278. Thus, the inclined cam face 272 on each rack 232 initially acts on the cam surfaces 273 defined by the slots 270 in the centermost pleater element to depress said pleater element to its illustrated position. In like manner, as each rack 232 progresses in the arrow 258 direction its cam face 272 engages the faces 282 formed by the slots 270 to successively force the rightmost pleater elements downwardly to their FIG. 16 positions. Simultaneously the leftmost pleater elements are forced downwardly by the rack extensions 271. It should be noted that slots 264 in the pleater elements to the left of the center pleater 276 are relatively shallow and define cam surfaces 283 which engage cam extensions 271 to force the left pleaters downwardly. Thus the shallow slots 270 in the right pleaters cooperate with racks 232, and the shallow slots 264 in the left pleaters cooperate with the racks 250, the arrangement being such that racks 232 traverse the right pleaters to sequentially depress them, and racks 250 traverse the left pleaters to sequentially depress them. It will be noted that depression of the pleater elements is in sequence from the center pleater element outwardly toward the endmost pleater element. This arrangement is advantageous in that it permits the fabric panel to be shifted transversely into a pleated configuration without undue stress on the fabric material (as will be explained hereinafter).

The pleaters 262 cooperate with the lower set of pleaters 284 shown in FIGS. 7, 16 and 21. This lower set of pleaters is fixedly carried on a supporting plate 286 which is mounted atop an elevator structure 288 by means of the beam elements 290, the arrangement being such that during upward movement of the elevator 288 the spaced pleater elemnts 284 pass upwardly between the conveyor chains 70 to lift the burlap panel therefrom. Power for the elevator 288 is derived from a fluid cylinder 292, and suitable guiding of the elevator is obtained by the piston-cylinder assemblies 294 between the elevator and machine base 296.

In operation of the pleater structure, when the chains 70 are moved to convey a fabric panel into the pleater station the rack 220 is in a leftward position (FIG. 16) and the elevator 288 is in a lowered position. Thus, the upper and lower pleater elements are spaced from one another, and sufficient clearance is provided for introduction of a fabric panel into the space between the pleater elements. When the fabric panel is entirely between the pleater elements the chains 70 are halted (by de-energization of cylinder 53) and the cylinder 292 is energized to move the lower set of pleater elements 284 upwardly to lift the fabric panel from the chains. Cylinder 216 is then energized to drive the rack elements 232 and 250 toward their FIG. 16 positions so as to sequentially form pleats in the fabric panels as shown in FIG. 21.

It will be noted from FIGS. 16, 20 and 21 that the lower edge portion of each pleater element 262 is provided with a series of slots 300. In the illustrated mechanism each of the pleater elements 262 is provided with eighteen slots corresponding in number to the number of wire strands to be inserted through the fabric pleats. Each of the pleater elements in the lower set of pleater elements 284 is provided with a corresponding number of slots 302 in its upper edge, the arrangement being such that when the pleaters are in their FIG. 16 positions a series of eighteen passages is formed through the pleater element assembly.

The purpose of these passages is to permit hollow needle structures to be driven through the fabric pleats, said needle structures serving as guides for subsequent insertion of the spiral wire strands previously described.

NEEDLE INSERTION (FIGS. 23 and 24)

Power for the needle insertion operation is derived from a fluid cylinder 306 shown in FIG. 7. The piston rod for cylinder 306 carries a rack 308 which meshes with a gear 310 carried by the shaft of a larger gear 312 located within the housing 313. Gear 312 in turn meshes with a gear 314 carried by the shaft of a relatively large gear 316 which meshes with the gear 318 carried on the shaft of a sprocket 320. The shaft for gear 318 and sprocket 320 also carries a gear 321 which meshes with a rack 326 said rack extending to a fixed connection with a bar 328 carried on the tubular slide elements 330 and 332. Elements 330 and 332 are slidably supported on the fixed guide rods 334 and 336, said guide rods being anchored at their opposite ends by means of the fittings 338 and 340. The slide elements 330 and 332 carry a crosshead 342 which mounts eighteen hollow needles 344, the arrangement being such that energization of cylinder 306 (FIG. 7) to move rack 308 is effective to move rack 326 in the arrow 346 direction to thereby carry the needles 344 through the pleater elements and pleated fabric panel as shown in FIG. 21. The needles are actually hollow tubes and are inserted through the pleated fabric prior to insertion of the undulating wire for functioning as guides to prevent deflection or jamming of the wire strands during their insertional movements.

The movement of the needles is preferably quite rapid, and the needles are necessarily of relatively great length, as for example seven feet. It is desirable that the needles be guided at points intermediate their ends during the working stroke, particularly during the beginning of the working stroke when the needles are not supported by the pleater elements. There is therefore provided a travelling guide structure 348 for supporting the needles during their reciprocatory movements. The travelling guide structure includes two tubular slide elements 350 and 352 carrying a crosshead 354. The crosshead is provided with eighteen spaced openings therethrough for slidably accommodating the various hollow needles 344 during their slidable movements.

In order to move the travelling guide 348 out of interference with the head 342 during the working stroke, the guide is provided with two downwardly extending arms 356 and 358 which fixedly connect with the chains 322. The drive sprockets for chains 322 are carried on the same shaft which carries rack drive gear 321; however, the diameter of the chain drive sprocket is less than the diameter of the rack drive gear 321 so that the chain 322 will be driven at a slower rate than the rack 326. Consequently, the travelling guide structure 348 will only move to a point adjacent the anchorage 340 during the time when head 342 is travelling to the leftward limit of its stroke. The arrangement is such that crosshead 354 slidably supports the intermediate portion of the needles 344 when they are in their rightmost positions and provides a travelling support during the leftward stroke of the needles into the pleater structure. In this manner whipping or bowing or fluttering of the needles will be avoided, and the needle insertion procedure can be carried out in a rapid jam-free manner.

In order to further guide and support the hollow needles a guide block structure may be provided on structure 370 as shown at 370a in FIG. 12. Structure 370a is provided with a series of substantially semicircular channels in its upper face to receive and support the end portions of the various needles 344.

SPIRAL STRAND INSERTION PROCEDURE

It will be noted from FIG. 21 that the leading edge of each needle is sharply pointed as at 360, with the edge portion 362 tapering back at a small angle to provide a point structure operative to easily penetrate the burlap-fabric panel during high speed insertion of the needle. When the needles are located within the pleater elements as shown in FIG. 21 the cylinder 150 (FIG. 6) is energized to feed the wire strands through the spiraling mechanism (FIG. 11) and into the hollow needles to the FIG. 21 position. By employing the hollow needles the wire strands 20 are enabled to be fed through the burlap material without interference with the burlap threads. It will be appreciated that this is of material advantage in providing a satisfactory product, particularly when the apparatus is operating at high speed such that a deflection of one or more of the wire strands by the burlap threads could easily jam the apparatus. In actual operations without the hollow needles 344 the product tends to be defective, and the wire strands very often jam in the machine. In this connection it will be appreciated that the spiral nature of the strands tends to promote a jamming characteristic as compared with a product using straight wire strands which are not as easily deflected from their course.

In use of the illustrated apparatus it is contemplated that the needle insertion operation will be completed before introduction of the strand-tip area into the needle interior. However, the needles may retract from the guide block structure 370a during advancement of the strands into the needle interiors, the most important aim being to have at least the tip of each strand within the needle interior as the strand is fed through the fabric pleats. Thus, in some instances the needle retraction operation and strand advancement operations may be carried out simultaneously, with the strand in effect following the needle through and out of the fabric pleats. In these instances only the leading pointed end area of each needle is required to be hollow.

If desired the needles may be hollow for their full lengths and may remain in extended positions within the pleater station during the entire strand-advancing operation. With such procedure no areas of the wire strands are exposed to the fabric fibers, and there is minimum tendency for the strands to jam in the machine.

The drawings show the strand feeding station and needle insertion station as located at opposite sides of the pleating station. It is contemplated however that the strand feeding station and needle insertion station could be located at the same side of the pleating station. With such an arrangement the strand insertion movement could follow very closely on the needle insertion movement, and still have the strands fully encased within the needles during the strand advance. The strand feeding station would in such an arrangement be located outside of the needle insertion station.

KNOTTING STATION

(FIGS. 12 through 15)

Referring to FIG. 1, it will be noted that the ends of the wire strands in the finished article are curled around or knotted. The strand-knotting operation is preferably performed at conclusion of the strand-insertion operation while the fabric is in a pleated condition (FIG. 21). The leftmost knotter mechanism 367 is shown in FIGS. 12 through 14, and the rightmost knotter 369 is shown in FIG. 15. The positions of these knotter mechanisms with respect to the other apparatus is best shown in FIGS. 6 and 7.

Referring to FIG. 12 the leftmost knotter comprises an elongated bed plate 371 having a series of spaced blocks 379 secured thereon to define eighteen separate grooves 373, the arrangement being such that one of strands 20 travels through each groove in the arrow B direction during the strand-insertion operation. The mechanism is shown in FIG. 12 with the parts thereof in the positions they occupy during the knotting operation, and the space through which the strand travels during the strand-insertion operation is therefore restricted by the knotter mechanisms.

Power for the knotting operation is derived from three sources. Thus, referring to FIGS. 6 and 7 there is provided a fluid cylinder 368 carried on a bracket-forming extension 370 of the elevator 288. The piston rod for cylinder 368 is connected with eighteen parallel plungers 372 (FIGS. 7 and 12) by means of a crosshead 377 so that energization of cylinder 368 is effective to move the plungers upwardly towards the bed plate 371 to the FIG. 12 position. Each plunger 372 carries a pin-like mandrel element 374 which projects upwardly above the bed surface 366 to form a mandrel surface for bending of the wire strand therearound during the knotting operation. Each plunger also carries a pin 375 which functions as a back-up device for the wire strand during the knotting operation.

In order to bend the wire strands around mandrels 374 there is provided a pin-like bending elements 376 carried on a rotary head 378. Bearings are provided at 380 and 382 for rotatably supporting the head 378 in a carrier structure generally indicated by numeral 384. Power for rotation of the head 378 is derived from a fluid cylinder 385 and rack 386. The drive from rack 386 comprises a gear 388 carried on shaft 390, a second gear 392 carried on shaft 390 and a rack 394 meshed with gear 392. The vertical face 396 of rack 394 is provided with a slot 398 which receives an extension 400 of a relatively long rack 402. It will be noted from FIG. 13 that rack 386 is of a relatively short length. However, the rack 402 is long enough to span the entire bank of knotter heads 378, with the teeth thereof engaging the gear portions 406 of the individual heads 378 as shown in FIG. 12.

It will be appreciated that movement of rack 386 (by cylinder 385) in one direction is effective to rotate all of the knotter heads 378 in one direction for effecting a strand-knotting operation. Reverse movement of the rack 386 is effective to return the heads 378 to their initial positions.

Between successive knotting operations the carrier 384 is retracted upwardly away from the bed surface 366 by means of the fluid cylinder 408. Cylinder 408 is mounted atop a bridge structure 410 located on an elongated housing 409. As will be seen from FIG. 6, housing 409 is mounted at its opposite ends on the beams 107 and 109. The piston rod 412 for cylinder 408 is connected with a crosshead 414 which carries the two depending rods 416 at its opposite ends. The lower end portions of these rods are anchored to the carrier 384 by means of cross pins 418. The arrangement is such that pumping of fluid into the lower end of cylinder 408 is effective to raise the carrier 384 upwardly from bed surface 366 to permit passage of the wire strands over the bed surface and into the pleater elements.

After each pleater operation pressure fluid is pumped into the upper end of cylinder 408 to quickly lower carrier 384 toward surface 366. As the carrier nears surface 366 cutter 210 slices through the wire strand to cut off the length thereof to the right of the cutter. During the cut-off operation the clamp structure 420 is effective to grip the wire and retain it in proper position for ensuring a clean cut at the desired location therealong. Clamp structure 420 comprises a series of spaced finger members 422 projecting downwardly from the carrier 384, the space between adjacent fingers being occupied by strand gripping elements 424, and the various strand gripping elements being pivotally mounted by means of a pin 426 extending through the finger members 422. It will be understood that in a construction having eighteen wire strand feeders there will also be employed eighteen wire gripper elements 424.

17

Each of the wire gripper elements is individually biased in a downward direction by means of a compression spring 428, said spring operating on the gripper element via a hollow plunger 430. The operation is such that as the carrier 384 is lowered its pivotally mounted gripper elements 424 strike the wire strands and compress the springs 428 to thereby provide a tight grip on the strands irrespective of any slight variation in vertical dimension of the various gripper elements spacing of bed surface 366 from the carrier, or variation in strand thickness.

It will be noted that the tip of cutter 210 is located slightly below the lower face 432 of the knotter head 378. Face 432 acts as a presser element to cooperate with the upper face of the fixed bushing 434 in ironing out a short portion of the wire strand from its spiral configuration, the purpose being to prevent an intermediate portion of the wire strand from interfering with its extereme end portion during the knotting operation. In this connection the major diameter of the spiral strand convolution is in an illustrative case in the neighborhood of one-quarter inch and the diameter of the wire is in the neighborhood of .040 inch. The movement of the carrier is preferably such as to leave a clearance of about .050 inch between face 432 and the upper face of bushing 434.

When rack 386 is moved to rotate the heads 378 the resultant rotation of each bending element 376 is such that a wire end portion adjacent cutter 210 is curled around the mandrel 374 and depressed into the annular opening 436 as the pin 376 nears the end of its rotary movement. Pin 376 is shown in FIG. 12 adjacent the end of its movement. It initially takes a position spaced about one hundered eighty radial degrees from the FIG. 12 position, so that it acts as a bending element for the end portion of the wire strand. During the final stage of the bending movement the end portion of the wire may cam against the registering wire portion to be deflected into the recess 436 so as to achieve the cross condition shown in FIG. 1.

The complete sequence of movements in operation of the FIG. 12 knotter structure is as follows. With the carrier 384 in a raised position, at conclusion of the strand feeding operation the cylinder 408 is energized to quickly lower the carrier 384 and cut off the wire strand. Simultaneously with lowering of the carrier 384 the plungers 372 are powered upwardly by cylinder 368 so that the mandrel 374 is guided into the central opening 440 in each head 378. Rack 386 is then powered to rotate the various knotter heads 378 for causing the bending elements 376 to be rotated around the mandrels 374 to effect the knotting operations. Carrier 384 and plunger 372 are then powered apart to separate or strip the elements 374 and 376 from the knot. Elevator 288 (FIG. 7) is then lowered to lower the lower set of pleater elements so that the fabric-wire strand assembly is deposited onto the conveyor chains 70 for carryover to the next operating station.

The right knotter structure 369 shown in FIG. 15 is similar to the left knotter in many respects, and similar reference numerals are therefore employed wherever applicable. In the FIG. 15 construction a fluid cylinder 442 is mounted on a fixed support structure 444 with its piston rod 446 connected with a crosshead 448, said crosshead carrying a depending connector rod 450 which is linked at 452 to a pair of levers 454. The linkage 452 preferably comprises an elongated shaft 456 extending between the two levers 454, said levers being preferably located at opposite end portions of the knotter apparatus and being fulcrumed on an elongated shaft 460 carried by support structure 444. The two levers 454 are linked to an elongated shaft 462 which carries a bank of reciprocable plungers 372, each of the plungers carrying a mandrel and back-up pin similar to the corresponding elements of the FIG. 12 structure. Each of the mandrels cooperates with a rotary knotter head 378 similar to the corresponding head in the FIG. 12 construction. The various knotter heads are rotatibly supported in a carrier 464 which is slidably mounted on face 445 of support structure 444. Carrier 464 is supported at its ends by the two rods 466 which depend from crosshead 448.

In operation of the FIG. 15 construction, energization of the fluid cylinder 442 is effective to move rod 450 upwardly for downward retraction of the plungers 372; simultaneously the carrier 464 is drawn upwardly by the rods 466 to free the right end area of the fabric-wire strand article for movement by the conveyor chains 70. After a predetermined movement of the conveyor chains the cylinder 292 is energized to raise elevator 288. Thereafter piston rod 446 is powered downwardly to bring elements 378 and 372 together, and rack 386 is powered to effect a knotting operation of pin 376.

SAFETY CUT-OFF ON FAILURE OF WIRE TO BE EXTENDED THROUGH BURLAP

*(FIG. 22)*

The wire-advancing operations are preferably carried out very rapidly, and under such rapid advance conditions there is possibility that one or more of the wires will fail to have its appointed travel and positionment during the cycle. Safetey means is therefore provided to automatically interrupt the cycle in the event that one or more of the wires fails to be properly located within the burlap.

The safety means may take any of several different forms, but an illustrative construction as shown in FIG. 22 comprises a housing structure 475 suitably mounted on a face portion of the right carrier 464, the arrangement being such that structure 475 is autimatically moved up at conclusion of one knotting cycle and down preparatory to the next knotting cycle.

Structure 475 slidably carries a series of bars 476, corresponding in number to the number of wire strands 20. The lower end portion of each bar is notched, as at 478 so as to register with the subjacent wire strand.

In the space between adjacent ones of bars 476 there is movably mounted a switch arm 480. Each arm has an end portion 482 registering with a contact 484 which is operatively located in the control circuit for the machine. As will be seen from FIG. 22, each of the switch arms 480 is spring-urged to a normal position opening the circuit through the adjacent contact. However, by upward movements of the bars 476 relative to housing 475 the arms 480 can be propelled to close the circuits through the various contacts 484. In the illustrated arrangement this upward movement is obtained on the downstroke of housing 475.

As an example of a suitable cycle, during the downstroke of the housing 475 (just prior to the knotting operation) the bars 476 may strike the subjacent strands 20 to be deflected thereby so as to complete the circuits at 484. This action allows the knotting cycle to begin.

In the event that the space beneath one of the bars 476 is unoccupied there will be no deflection of that bar, and the superjacent contact 484 will remain open. This action automatically prevents the knotting cycle from starting and appraises the attendant of the unsatisfactory condition of the wire strand.

FLATTENING OF THE FABRIC PANEL
*(FIG. 25)*

During the knotting operations the fabric panel is held in a pleated condition (FIG. 19 except that needles 344 are withdrawn). The wire strands 20 are frictionally engaged with the burlap fibers and therefore the burlap tends to retain its pleated configuration even after it is removed from the pleaters.

In order to return the burlap to a substantially flat configuration there is provided the ironing or flattening station 500 shown in FIGS. 4 and 25. It will be noted from FIG.

4 that the conveyor chains 70 run through the flattening station so as to convey pleated panels from the pleater station. The panels must be lifted from the conveyor chains to effect the flattening operations, and accordingly there is provided an elevator 502 powered by the fluid cylinder 504. The upper portion of the elevator is defined by spaced blocks 506 which pass upwardly in the spaces between the conveyor chains during upward movement of the elevator. One of the blocks registers with an overlying bar 508, which may be rubber faced and/or spring loaded in a downward direction. The arrangement is such that upward movement of the elevator is effective to cause a central portion of a fabric panel and the reinforcing strands to be gripped between bar 508 and the subjacent block.

The smoothing or flattening operation is carried out by means of the rubber-coated rolls 510, shown as four in number in the drawings. For differentiation purposes the rolls are given the different reference numerals 511 through 514. In the illustrated construction the right rolls 511 and 512 are powered in counterclockwise directions to iron or smooth out the right portions of the burlap panel, and the two left rolls 513 and 514 are powered in clockwise directions to smooth or iron out the left portions of the panel. Rolls 511 and 513 may if desired be constructed as eccentric devices so as to have intermittent contact with the fabric surface.

As above indicated, the central portion of the panel is gripped between bar 508 and the subjacent block so as to preclude any bodily lateral shift of the panel. Power for operating the rolls 510 is in the illustrated embodiment derived from an electric motor 516 which has its driveshaft affixed to a sprocket 520. An endless chain 518 is trained around sprocket 520 and the other three sprockets 522, 524 and 526 so as to be driven in the arrow 527 direction by the motor 516. Sprocket 526 is carried on a shaft which extends through the unpleating station to connection with another sprocket, about which is trained an endless chain 529. This chain is trained around another sprocket carried on the shaft of roll 512 so as to cause the shaft to rotate in the desired direction (counterclockwise in FIG. 25). The shaft for roll 512 carries another sprocket about which is trained the endless chain 531, said chain also being trained around a sprocket affixed to the shaft for roll 511, the arrangement being such that roll 511 is driven counterclockwise to effect the ironing out operation.

It will be seen from FIG. 25 that the sprocket arrangement is such that sprocket 524 rotates in a clockwise direction. The shaft for sprocket 524 carries a second sprocket which is aligned with a sprocket on the shaft for roll 514. An endless chain 529a is trained around these sprockets to rotate the roll 514 in a clockwise direction. The shaft for roll 514 carries an additional sprocket, and an endless chain 531a is provided to transmit clockwise rotation to the roll 513 for ironing out purposes.

During the smoothing operation it is not desirable that the rubber rolls in any way act against the undulatory wire reinforcement strands, since such action might undesirably cause a jamming or wearing of the machine rolls. In order to prevent any undesired contact between the rubber rolls and the wire strands each of the rolls is provided with a series of peripheral grooves as shown at 530. It will be noted from FIG. 26 that these peripheral grooves register with the wire strands such that the roll is prevented from direct contact with the strand while having appropriate pressure contact with the burlap material.

The use of rubber rolls as shown in FIG. 26 has proven of material advantage as respects ability to iron out the burlap pleats. Additionally, the rubber rolls have been found to have relatively soft contact on the burlap material such as to avoid any wear of the burlap fibers or fuzzing of the general burlap surface contour. Previous to the use of rubber rolls attempts had been made to iron out the burlap pleats using laterally traveling brushes arranged on endless chains and operating along the upper surface of the burlap outwardly laterally from the bar 508. Such brushes in general were satisfactory as regards smoothing out of the pleats, but they suffered to some extent because they had a tendency to wear the burlap and set up a fuzzy burlap surface contour. With the illustrated arrangement such a disadvantageous condition is avoided.

PAPER INTRODUCTION
(Figs. 27 and 29)

By reference to FIG. 29, it will be seen that paper for protecting the edges of the burlap-wire strand assembly is taken from a supply roll 540. In its supplied condition it is in the form of a flat web, and before it can be completely secured to the edges of the burlap-wire strand assembly it must be folded so as to have a wrap-around relationship with respect to the burlap lateral edges. There is thus provided the folder mechanism indicated generally by numeral 542 in FIG. 27.

Prior to introduction of the web into the folder mechanism the web may be passed through an adhesive-applying station 544, best shown in FIG. 29. As shown in the drawings said station comprises a conventional gluepot 546 having a relatively large smooth-surfaced roll 548 located to dip into a body of liquid glue 550 in the gluepot. Power for drawing the paper web over the roll 548 is derived from a heavy rubber roller 552 which is adapted to be driven from the previously mentioned conveyor chains 70. By this arrangement the burlap travel and paper travel are correlated with respect to one another such as to prevent any buckling of or strain on the paper.

Referring again to the adhesive station 544 (FIG. 29), the paper is maintained in engagement with roll 548 by the idler rolls 554, 556 and 558. The paper is turned from a generally horizontal plane into a generally vertical plane by means of the vertical guide roll 560. As the paper web emerges from the guide roll 560 it takes a right angle turn and enters into the folder structure 542.

By reference to the three sectional views FIGS. 29, 30 and 31 it will be seen that during travel of the paper through the folder it is progressively converted from a substantially flat configuration (FIG. 29) to a V-shaped configuration (FIG. 31). The folder is provided with the inturned flanges at 562 to guide the paper and prevent it from in any way losing contact with the folder.

As each paper web emerges from its folder it wraps about the lateral edge of the burlap panel and thence travels with the burlap to a position overlying a fixed block 564 (FIG. 28). Block 564 mounts a series of automatic air-operated stapling guns 634, each being provided with an air pressure line 635 for automatic operation at the desired point in the sequence (i.e. when the burlap-paper assembly is motionless).

Cooperating with block 564 is a second movable block 566 which is moved to a clamping position on the paper web by means of the fluid cylinder 568. Suitable links are provided at 570 to guide block 566 in its movement. It will be understood that block 566 acts as an anvil to clinch the staples driven upwardly from the stapling guns 634. The use of stapling guns is as previously noted optional to the aforementioned use of sewing and gluing. For many applications the use of sewing produces the most satisfactory product. The sewing can be carried out with conventional sewing machine heads such as shown in FIG. 35.

In the illustrated arrangement the paper edging is introduced onto the fabric material after the unpleating operation. It is however contemplated that the paper edging could be introduced onto the fabric prior to the panel-formation operation. In such an arrangement each paper web would be introduced onto the edges of the fabric web before its passage into trough structure 42. The paper would be introduced as a flat strip onto the lower surface of the fabric web, with a portion of the paper lying outside of the fabric web edge. During the pleating and unpleating operations the paper strip would remain flat, but after the unpleating operation the outer edge portion of each paper strip would be wrapped around the upper face of the fabric web by a mechanism similar to that shown in FIG. 29.

PAPER CUT-OFF AND PANEL DISCHARGE

*(Figs. 27 and 32)*

In the illustrated embodiment the paper is affixed to each edge of the burlap while the paper is in the form of a continuous web. It thus becomes necessary to sever the paper web before discharge of the panel assembly from the machine. For this purpose there is provided an air cylinder 640 having a pivotal mounting at 642 and having a piston rod 644 connected with a pair of crank arms 645 by means of a cross pin 648. The cranks 645 are fulcrumed as a unit on a fixed shaft 650, so that introduction of pressure fluid into the lower end of cylinder 640 is effective to move the cranks 645 in a clockwise direction (FIG. 32). Each of the cranks carries a cutter bar 646 which during clockwise motion of the cranks slices through the subjacent paper web. The cutter bars are suitably mounted and adjusted so that their operative edges are spaced the desired distance (eight inches in the illustrated embodiment) such that the paper web is severed at a point coincident with the corresponding front or rear edge of the burlap panel. Different panel dimensions will of course necessitate different adjustments of the cutter bars.

After cutting of the paper material it is preferred to immediately discharge the panel assembly from the machine, and one desirable mechanism for accomplishing this purpose is shown in FIG. 4. The most advantageous direction of discharge for the panel is downwardly into its shipping carton, and accordingly it is not desired to support the panels from subjacent conveyors such as the conveyor chains 70 during the discharge operation, since such conveyor chains would be in the desired path of discharge.

To effect the discharge operations there may be provided the overhead conveyor mechanism defined by the rubbers belts 660. As shown in FIGS. 4 and 27, these belts are trained around pulleys 662 and 664. Pulleys 664 are located on the same shaft as the aforementioned pressure roller 552, which is driven from the conveyor chains 70. Thus the conveyor chains provide operative power for the belts 660 such as to synchronize the movement of the various panels throughout their travel in the machine and permit the panels to be discharged in an orderly sequence.

In the illustrated arrangement the discharge mechanism comprises a pair of trap doors 670 and 672 fulcrumed respectively on the pivot shafts 674 and 673.

These trap doors extend entirely across the lateral dimension of the fabric panels and are retained in their FIG. 4 positions by means of the fluid cylinders 678. However, when a panel has been shifted into position on the trap door as shown at 12i in FIG. 4, pressure fluid may be pumped into the upper end of each cylinder 678 to retract the piston rods 680 into the cylinders for thereby swinging the trap doors downwardly about their pivot shafts in such a manner as to cause the fabric panel to drop through the open space formed between the swung-down doors.

As will be seen from the drawings, the space below the trap doors is occupied by a platform or framework 690 having the idler rolls 692 journaled thereon. The arrangement is such that an open topped box or shipping carton 694 of cardboard or the like may be manually or otherwise slid onto the rollers 692 to a position for reception of the panels as they are sequentially dropped through the trap doors. Suitable counter mechanism may be employed to notify the attendant when a desired number of panels have been deposited into the shipping boxes. If desired the device may be given an automation character by employing mechanism for stopping the machine after the desired number of panels have been deposited in the box or by energizing a power device for shifting the box off of the platform 690 and replacing it with another empty box. The degree of automation will of course depend on such factors as volume of production, cost of product, and particular facilities of the manufacturer.

During the previous description the invention has for the most part been described with reference to the use of stapling and gluing as the means for securing the paper edging onto the lateral edges of the fabric panels. It is herein noted however that other means of attachment can be employed. For example, if desired the paper edging can be secured to the fabric panel through the use of the sewing machine stitchers or heads shown in FIG. 35. FIG. 35 is taken in the same general direction as FIG. 28, and it will be understood that the sewing machine head 570 there shown may be employed in the same general location as the previously described stapling guns 634.

As with the previously described arrangement, the paper edging may be fed from supply roll 540 into the folder structure 542 to cause it to be wrapped around the lateral edges of the burlap panel 12g.

The sewing machine head 570 is arranged downstream of the folder 542, and as the burlap panel 12g is conveyed by the chains 70 the sewing machine needle 572 is vertically reciprocated to stitch the paper edging to the burlap fabric.

The use of stitching as opposed to stapling provides a more extensive locking of the paper to the burlap, and therefore the previously described gluing operation can in many cases be eliminated. In this connection it will be noted from FIG. 35 that the illustrated supply roll 540 introduces the paper web directly into the folder 542 without first traversing a gluing station such as is employed in the FIG. 29 illustration.

It will be understood that during the periods that the burlap panels are motionless (i.e. when the conveyor chains 70 are stopped) it is not desired to operate the sewing machine heads 570. Thus, each of the sewing machine heads is preferably operated in direct synchronism with the conveyor chains 70, and for this purpose there is provided a chain drive 574 powered in any suitable manner from the conveyor chains 70. The power can be taken at any desired point from the conveyor chains 70, but as an example, the drive chain 574 could be driven from a sprocket carried on the previously described shaft 57 (FIGS. 4, 5 and 27). It will be understood that chain 574 is trained around a sprocket carried on the shaft 578 which extends from sewing machine head 570 (FIG. 35). The shaft 578 is of course suitably connected with the head 570 in a manner to provide the desired reciprocation of needle 572 for performing the desired stitching operations. It will be understood that by the described arrangement the operation of the sewing machine head 570 is economically synchronized with the operation of chains 70 so as to provide the desired stitch pattern without any jamming of the sewing machine.

Referring to FIGS. 36 through 45, there are disclosed several shapes or configurations which the wire strand 20 may operatively assume. FIGS. 36 and 37 illustrate what might be termed a zig-zag configuration, with the wire material assuming a flat configuration when viewed in the endwise direction.

It will be understood that in order to provide the wire strand configuration of FIGS. 36 and 37, the strand-undulating mechanism shown in FIG. 11 is suitably changed to give the desired strand contour. The exact construction of the strand-undulating mechanism can be varied, but as an example the strand-undulating mechanism could take the form of a powered set of rolls having V-shaped passages on their peripheries such that high speed roller rotation would drive the strands through the rolls and form the V-shaped or zig-zag configurations therein as shown in FIG. 36. As with the spiral configuration shown in FIG. 1, the FIG. 36 configuration would be driven through the fabric material by the previously described procedure of pleating the fabric and driving the hollow guide needles through the formed pleats to guide the undulatory strand material during its advancement movement. The amplitude of the undulations would of course be related to the inner diameter of the tubes or needles such as to permit the undulatory material to be freely advanced within the needles in the previously described high speed manner.

FIGS. 38 and 39 illustrate another configuration which the undulatory strand material might take. The FIG. 38 configuration is flat in the endwise direction and forms a series of arcuate loops 580 which reoccur at desired points along the strand length.

FIGS. 40 and 41 illustrate another configuration which the strand material might assume while performing its desired function of reinforcing the fabric panel. It will be understood that the specific undulatory configuration is a matter of choice insofar as certain aspects of the present invention are concerned, and that various ones of the configurations can be operatively employed to give a desired reinforcing action. In this connection, it will be seen that the FIG. 40 configuration provides a series of relatively small amplitude undulations at 582 and a series of larger undulations at 584. In certain installations the large and small undulations would selectively and independently flex under load so as to provide a desired reinforcement action.

The strand configuration shown in FIGS. 42 and 43 includes a series of wire loop portions 586 interconnected by the longitudinally extending portions 588, the arrangement being such that flexing of the loops and slight elongation of the portions 588 can take place under load so as to provide the desired cushioning action.

The configuration shown in FIGS. 44 and 45 includes a series of small amplitude undulations 590 interconnected by the elongated sections 592, the arrangement being such as to permit flexing by an axial separation of the small undulations.

It will be understood that the wire strand reinforcement material can be given various undulatory configurations other than the specific configurations shown in FIGS. 36 through 45. Also, in certain instances the undulatory character of different strands in a given panel may be varied, i.e. strands in one part of the panel might have relatively large amplitude undulations and other strands might have relatively small amplitude undulations, or no undulations at all. Since each strand is fed from a different supply mechanism the gauge of the wire strand material can be varied in different portions of the panel.

This arrangement is in contrast to certain conventional prior art arrangements wherein each strand of material is fed from the same supply reel into a different point along the burlap fabric. In such arrangements the strand is fed through the burlap, the burlap is then advanced a small incremental distance, the succeeding portion of the strand supply is then advanced into a newly presented portion of the burlap, and the burlap is again advanced an incremental distance, this procedure being repeated until the desired number of strands have been introduced into the fabric. With such prior art arrangements all of the strands are necessarily of the same character, and no variation in strand contour is possible.

The apparatus thus far described has operated so as to cut the fabric panels to length before pleating and insertion therethrough of the wire reinforcement strands. However the panels can be cut to length after insertion of the wire reinforcement strands. Thus, referring to FIG. 34 there is shown an apparatus wherein the panel-forming shears 86 are disposed adjacent the downstream end of the machine.

The general structure of each component in the FIG. 34 mechanism may be the same as the corresponding component in the FIG. 4 arrangement, and similar reference numerals are employed for corresponding components. In the FIG. 34 arrangement the burlap is fed from a supply reel 24 over a powered feed roll 36 and thence into an accumulator trough 42, from where it is introduced underneath the fixed smoother bars 698 and onto the conveyor chains 70. It will be noted that the fabric is received onto the chains 70 without first being cut to panel length. The chains 70 may be indexed forward predetermined amounts (as for example twenty-two inches) by an indexing cylinder similar to the previously discribed cylinder 51. However, the FIG. 34 arrangement does not require a spacing cylinder such as the aforementioned cylinder 53. In the FIG. 34 unit the conveyor operation may be a simple sequence of stop—index one panel length—stop—index one panel length—etc.

The conveyor chains 70 as shown in FIG. 34 extend through the pleater station 96 which may be built in a similar fashion to the mechanism of FIGS. 6, 7, 16, and 19. As with the FIG. 6 pleater mechanism, the FIG. 34 pleater station may have the needle insertion station and strand insertion station arranged at its oposite sides.

Unpleating of the fabric may be performed in an unpleating station 500 built as shown in FIGS. 4 and 25, except that the unpleater rolls are preferably somewhat elongated in axial directions so as to sufficiently flatten the fabric without tendency for it to reassume its pleated shape. In this connection it will be appreciated that since the fabric is still uncut when it passes through the unpleater station there is a tendency for the fabric material upstream of the unpleater to exert a pleat retention force on the material within the unpleater station. By suitably elongating the unpleater rolls this pleat retention force is prevented from interfering with the unpleating operation.

The fabric material is advanced from the unpleating station through an edging adhering station 701 which may have the mechanisms 542 therein for folding the edging material around the fabric edges as shown in FIGS. 29 through 31. Adhering of the edging material to the fabric may be effected by various means, as for example by gluing mechanisms, stapling mechanisms and/or sewing mechanisms, herein generally indicated by the numeral 707. The pressing mechanism 566 (FIG. 28) may be eliminated if desired.

The conveyor chains 70 are trained around sprockets 69 as in the arrangement of FIG. 5. In the FIG. 34 arrangement the spaces between adjacent ones of the sprockets 69 may contain fingers 710 which project from a fixed sheet or bed structure 712, the arrangement being such that the fabric web is transferred from the chains 70 onto the bed structure during its final travel through the apparatus.

In order to move the fabric over bed structure 712 there may be provided a power roll 713 and an idler roll 714, both rolls preferably extending entirely across the bed structure width so as to engage the entire fabric web.

Power for roll 713 may be derived from the shaft 57 for sprockets 69, as by equipping the shaft with an auxiliary sprocket 716. In the illustrated ararngement shaft 718 for roll 713 is equipped with a sprocket 720, and an endless drive chain 722 is trained around the two sprockets 716 and 720 to transmit the drive from shaft 57. The diameters of the sprockets and drive roll are chosen so as to give the drive roll a peripheral speed equivalent to the linear speed of chains 70, whereby to prevent any undue tension on the fabric while it is on bed structure 712.

Prior to its discharge from the apparatus the fabric web may be cut to form individual panels by the shears 86, after which each panel may be directed gravitationally into a subjacent shipping container similar to container 694 shown in FIG. 4.

During the previous description the invention has been depicted in forms wherein a plurality of undulatory wire strands are simultaneously driven into a fabric web, as at station 96. However, if desired the FIG. 34 apparatus may be modified so that the undulatory strands are driven into the fabric at different times, i.e. one after another in a predetermined timed sequence. With such an arrangement the fabric web may be indexed relatively short distances past a single strand feeder-needle feeder assembly. Nevertheless the preferred and most desirable arrangement will in many cases include the "strand bank" arrangement previously described.

The drawings necessarily show many details of construction usable in illustrative examples of the invention. However, it will be appreciated that in some cases certain features of the apparatus may be omitted or varied, and that the invention comprehends such variations and sub-combination arrangements as come within the scope of the appended claims.

What we claim as our invention is:

1. Apparatus for making reinforced webs comprising a pleater for shaping a web so that it has a multiplicity of closely spaced generally parallel pleats, a conveyor for intermittently passing webs into and out of said pleater in a direction parallel to said pleats, a plurality of generally parallel tubular needles each having an open outer end and extending transversely of said pleats, said needles being axially movable inwardly and outwardly respectively between a retracted position at one side of said pleater and said conveyor and an advanced position in which said needles each pierce all of said pleats, means for axially advancing said needles in an outward direction from retracted to advanced position causing said needles each to pierce all of said pleats, strand driving means at the opposite side of said pleater and said conveyor for inserting reinforcing strands axially into said respective needles in an inward direction through the open outer ends thereof while the latter are in their advanced positions so that when said needles are retracted said strands will remain in said web threaded through the pleats thereof, means for axially retracting said needles in an inward direction from advanced to retracted position, and means beyond said pleater along the path of said conveyor for ironing out the pleats in the strand reinforced webs delivered intermittently by said conveyor.

2. The apparatus defined in claim 1, wherein means are provided between said strand driving means and said pleater for forming undulations in said strands in response to the aforesaid axially inward movement thereof.

3. The apparatus defined in claim 1, wherein means are provided for severing and knotting the ends of said strands after insertion thereof as aforesaid.

4. The combination comprising a web pleating station having means for pleating a web; a strand-feeding station for feeding strands through the web while it is in the pleating station; a web unpleating station spaced from said pleating station having means for unpleating the web; conveyor means running beneath said pleating and unpleating stations; a first lift structure operative to raise a web from the conveyor means into the pleating station; and a second lift structure operative to raise a web from the conveyor means into the unpleating station.

5. In a method of forming strand-reinforced panels, the steps of intermittently advancing web material past spaced work stations, at the first station between intermittent advances of the material forming pleats in a section of the material and driving reinforcing strands transversely through the pleats, and at the second station between intermittent advances of the material ironing out the pleats in the strand reinforced section.

6. The method defined in claim 5, including the further step of cutting the material into panels.

7. Apparatus for making reinforced panels comprising a cutter, first conveyor means intermittently operated to feed a predetermined length of web material to said cutter, means for operating said cutter to cut the material into panels, second conveyor means intermittently operated to remove the panels from the cutter after operation of the cutter, first power means operatively connected to the first and second conveyor means for advancing the same to control the length of material fed to said cutter, second power means operatively connected to said second conveyor means for advancing said second conveyor means a predetermined distance relative to said first conveyor means after the operation of said cutter to control the spacing between adjacent cut panels, and means for feeding reinforcement strands into each cut panel after a predetermined travel thereof from said cutter by said second conveyor means.

8. Apparatus for making reinforced panels comprising a cutter, a first conveyor for feeding web material past said cutter to be cut into panels, a second conveyor for removing cut panels from said cutter, a slip clutch connection between said conveyors, first intermittent power means for driving said first conveyor and for driving said second conveyor through said slip clutch, second intermittent power means for driving said second conveyor independently of said first conveyor, and means operable between intermittent operations of said conveyors for forming pleats in said panels and feeding reinforcement strands through the pleats.

9. The method of forming strand-reinforced fabric panels, comprising the steps of simultaneously operating a web supply conveyor and an aligned panel conveyor for a predetermined time period to convey a web of fabric material through a web cutter and into a predetermined position partially supported on both conveyors, operating the web cutter to sever a panel from the web, operating the panel conveyor for a predetermined time period while holding the web supply conveyor motionless to space the panel from the web by a predetermined distance, forming a series of parallel pleats in the panel, feeding reinforcing strands transversely through said pleats, operating the panel conveyor to move the panel a predetermined distance, and ironing out the pleats in the panel.

10. The combination comprising a web supply, a pleater station downstream from said web supply having means for pleating the web, a strand-feeding station adjacent said pleater station having means for driving strands transversely through the pleats of the web material when located at said pleater station; an unpleater station downstream from the pleater station having means to iron out the pleats in the web, and means for conveying a web of material successively from the web supply through the pleater and unpleater stations in a series of intermittent movements so that the web can be treated successively in said stations.

11. The method comprising the steps of simultaneously operating an upstream conveyor and an aligned downstream conveyor for predetermined time period to convey a web of fabric material through a web cutter, operating the web cutter to sever a fabric panel from the web, operating the downstream conveyor for a predetermined time period while holding the upstream conveyor motionless to space the panel severed from the web by a predetermined distance, forming pleats in the severed panel, advancing at least one hollow needle through the panel pleats, feeding a reinforcement strand into the hollow needle, and withdrawing the needle to leave the strand in the pleats.

12. The combination comprising a cyclically operable web cutter, a conveyor for feeding web material to said cutter, cyclically operable means powered in timed relation with said cutter for removing a cut length of the web from said cutter and for spacing each cut web length from the remaining web material by a predetermined distance, means for forming pleats in the cut web length, means for advancing a hollow needle through the pleats of the cut web length, means for advancing a reinforcement strand into the needle, and means for withdrawing said needle to leave the strand in the pleats.

13. The combination comprising a cyclically-operated cutter, a cyclically-operated conveyor for feeding web material to said cutter, cyclically-operated means for removing a cut length of web from said cutter at a faster rate than the rate of web feeding, whereby the cut web lengths are spaced predetermined distances from the fed-in material, cyclically operable means operative on each cut web length to form pleats therein, means for advancing a tubular guide element through the formed pleats, means for feeding a reinforcement strand into the tubular guide element, and means for withdrawing the guide element from the web lengths to leave the fed strands in the web length pleats.

14. Apparatus for making reinforced material comprising a pleating station having means for pleating a piece of material, an unpleating station having means for unpleating the piece of material, means for intermittently advancing a piece of material through said pleating and unpleating stations in succession, means for actuating said pleating means between the intermittent operation of said advancing means to pleat a piece of material at said pleating station, means for driving reinforcing strands transversely through the pleats of the material at said pleating station, and means for actuating said unpleating means between the intermittent operation of said advancing means to unpleat a piece of material at said unpleating station.

15. The method of making reinforced panels comprising simultaneously operating an upstream conveyor and an aligned downstream conveyor for a predetermined period of time to convey a web of material past a cutter, operating the cutter to sever a panel from the leading end of the web, operating the downstream conveyor for a predetermined period of time while holding the upstream conveyor motionless to space the severed panel from the web by a predetermined distance, and feeding a reinforcing strand into the severed panel after it has been spaced a predetermined distance from the web as aforesaid.

16. Apparatus for making a reinforced web comprising means for holding the web in a condition such that it has a multiplicity of closely spaced generally parallel pleats, a plurality of generally parallel tubular needles each having an open outer end and extending transversely of said pleats, said needles each being elongated and longitudinally continuous to provide an uninterrupted strand passage, needle support means at one side of said web supporting said needles for movement axially inwardly and outwardly respectively between a retracted position at said one side of the web and an advanced position in which said needles each pierce all of said pleats, means for axially advancing said needles in an outward direction from retracted to advanced position causing said needles each to pierce all of said pleats, strand inserting means at the opposite side of said web for inserting reinforcing strands axially into said respective advanced needles in an inward direction through the open outer ends thereof so that said strands extend through all of said pleats, whereby when said needles are retracted said strands will remain in said web threaded through the pleats thereof, and means for axially retracting said needles in an inward direction from advanced to retracted position.

17. Apparatus for making a reinforced web comprising means for holding the web in a condition such that it has a multiplicity of closely spaced generally parallel pleats, a plurality of generally parallel tubular open-ended needles each extending transversely of said pleats, said needles each being elongated and longitudinally continuous to provide an uninterrupted strand passage, needle support means supporting said needles for axial movement to a first position in which said needles each pierce all of said pleats and to a second position in which said needles are withdrawn from said pleats, means for axially moving said needles to said first position to cause said needles each to pierce all of said pleats, strand inserting means for inserting reinforcing strands axially into said respective needles while the latter are in their first positions aforesaid so that said strands extend through all of said pleats, whereby when said needles are withdrawn to their second positions aforesaid said strands will remain in said web threaded through the pleats thereof, and means for axially moving said needles from said first position to said second position.

References Cited by the Examiner

UNITED STATES PATENTS

| | | | |
|---|---|---|---|
| 220,447 | 10/79 | Uhlig | 223—29 |
| 953,039 | 3/10 | Kenoyer | 112—174 |
| 1,260,023 | 3/18 | Partmann et al. | 112—174 |
| 1,690,100 | 11/28 | Bull | 140—3 |
| 1,891,782 | 12/32 | Sager | 38—143 |
| 2,032,026 | 2/36 | Chapman | 226—108 |
| 2,062,552 | 12/36 | Burgess et al. | 153—66 |
| 2,166,636 | 7/39 | Marcus et al. | 140—101 |
| 2,218,749 | 10/40 | Heilman | 140—3 |
| 2,227,391 | 12/40 | Kernal | 223—29 |
| 2,398,900 | 4/46 | Welch | 153—66 |
| 2,513,611 | 7/50 | Woller | 153—66 |
| 2,558,196 | 6/51 | Pinsuti | 112—174 |
| 2,599,226 | 6/52 | Briem | 112—218 |
| 2,624,138 | 1/53 | Taylor | 38—143 |
| 2,749,962 | 6/56 | Kitselman. | |
| 2,759,500 | 8/56 | Nelson | 140—101 |
| 2,781,532 | 2/57 | Hoffman | 12—51 |
| 2,800,151 | 7/57 | Shockey et al. | 140—3 |
| 2,862,466 | 12/58 | Bryant et al. | 112—79 |
| 2,911,014 | 11/59 | Van Nest | 140—71 |
| 2,916,792 | 12/59 | Crook et al. | 25—106 |
| 2,944,584 | 7/60 | Calmy | 153—66 |
| 2,988,128 | 6/61 | Pappelendam | 153—77 |
| 3,010,489 | 11/61 | Lenart et al. | 140—3 |
| 3,029,178 | 4/62 | Carver | 156—359 |
| 3,084,090 | 4/63 | Rambo et al. | 156—299 |
| 3,095,130 | 6/63 | Schultz | 226—108 |

CHARLES W. LANHAM, *Primary Examiner.*

DAVID J. WILLIAMOWSKY, RICHARD A. WAHL, NEDWIN BERGER, WILLIAM J. STEPHENSON,
*Examiners.*